(12) United States Patent
Zhou et al.

(10) Patent No.: US 11,172,457 B2
(45) Date of Patent: Nov. 9, 2021

(54) TRANSMISSION CONFIGURATION INDICATION STATE ORDERING FOR AN INITIAL CONTROL RESOURCE SET

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 16/683,179

(22) Filed: Nov. 13, 2019

(65) Prior Publication Data

US 2020/0154380 A1    May 14, 2020

Related U.S. Application Data

(60) Provisional application No. 62/767,483, filed on Nov. 14, 2018.

(51) Int. Cl.
*H04W 56/00* (2009.01)
*H04W 72/04* (2009.01)
(Continued)

(52) U.S. Cl.
CPC ......... *H04W 56/001* (2013.01); *H04L 1/0026* (2013.01); *H04L 5/0051* (2013.01); *H04W 72/046* (2013.01); *H04W 72/0493* (2013.01)

(58) Field of Classification Search
None
See application file for complete search history.

(56) References Cited

U.S. PATENT DOCUMENTS

2018/0199363 A1   7/2018  Lee et al.
2018/0302889 A1  10/2018  Guo et al.
(Continued)

FOREIGN PATENT DOCUMENTS

CN         108199819 A      6/2018
WO     WO-2018128376 A1    7/2018
(Continued)

OTHER PUBLICATIONS

Huawei, et al., "Remaining Issues on Beam Failure Recovery", 3GPP Draft, 3GPPTSGRANWG1 Meeting#93, R1-1805953, 3rd Generation Partnership Project (3GPP), Mobile Competence Centre, 650, Route Des Lucioles, F-06921 Sophia-Antipolis Cedex, France, vol. RAN WG1. No. Busan, Korea, May 21, 2018-May 25, 2018, May 11, 2018 (May 11, 2018), XP051461661, 6 Pages, Retrieved from the Internet: URL: http://www.3gpp.org/ftp/tsg%5Fran/WG1%5FRL1/TSGR1%5F93/Docs [retrieved on May 11, 2018], the whole document.
International Search Report and Written Opinion—PCT/US2019/061399—ISA/EPO—dated Feb. 26, 2020.
NTT DOCOMO, et al., "Discussion on CORESET0", 3GPP Draft, 3GPP TSG RAN WG1 Meeting#95, R1-1813934 Discussion on CORESET0_REV04, 3rd Generation Partnership Project (3GPP), Mobile Competence Centre, 650, Route Des Lucioles, F-06921 Sophia-Antipolis Cedex, France, vol. RAN WG1, No. Spokane,
(Continued)

*Primary Examiner* — Otis L Thompson, Jr.
(74) *Attorney, Agent, or Firm* — Holland & Hart LLP

(57) ABSTRACT

Methods, systems, and devices for wireless communication are described. Generally, the described techniques provide for efficient identification of spatial parameters for receiving control information in an initial coreset. In one example, a user equipment (UE) may receive a transmission configuration indication (TCI) state indicating reference signals quasi co-located with a control information transmission in a coreset. The TCI state may be identified from a set of TCI states, where the set of TCI states includes at least one TCI state corresponding to each synchronization signal block (SSB) (e.g., each quasi co-location (QCL) source) associated with the initial coreset. The UE may identify spatial
(Continued)

parameters for monitoring the coreset for the control information transmission in accordance with the TCI state.

52 Claims, 16 Drawing Sheets

(51) Int. Cl.
*H04L 5/00* (2006.01)
*H04L 1/00* (2006.01)

(56) References Cited

U.S. PATENT DOCUMENTS

| | | | |
|---|---|---|---|
| 2020/0045709 A1* | 2/2020 | Seo | H04L 5/0048 |
| 2020/0100311 A1* | 3/2020 | Cirik | H04W 72/042 |
| 2020/0336928 A1* | 10/2020 | Seo | H04W 56/001 |
| 2021/0007086 A1* | 1/2021 | Liu | H04W 72/042 |
| 2021/0022152 A1* | 1/2021 | Yang | H04L 5/0048 |
| 2021/0058906 A1* | 2/2021 | Seo | H04L 5/0044 |
| 2021/0083833 A1* | 3/2021 | Zhou | H04L 5/0092 |
| 2021/0153074 A1* | 5/2021 | Yang | H04W 74/0833 |

FOREIGN PATENT DOCUMENTS

| | | |
|---|---|---|
| WO | WO-2018129300 A1 | 7/2018 |
| WO | WO-2018204571 A1 | 11/2018 |
| WO | WO-2018204882 A1 | 11/2018 |

OTHER PUBLICATIONS

USA, Nov. 12, 2018-Nov. 16, 2018, Nov. 13, 2018 (Nov. 13, 2018), XP051480138, 80 Pages, Retrieved from the Internet: URL: http://www.3gpp.org/ftp/tsg%5Fran/WG1%5FRL1/TSGR1%5F95/Docs/R1%2D1813934%2Ezip [retrieved on Nov. 13, 2018], Paragraph [TS38.213Section10.1].

ZTE, et al., "Details and Evaluation Results on Beam Indication", 3GPP Draft, 3GPP TSG RAN WG1 Meeting #91, R1-1719538 Details and Evaluation Results on Beam Indication, 3rd Generation Partnership Project (3GPP), Mobile Competence Centre, 650, Route Des Lucioles, F-06921 Sophia-Antipolis Cedex, vol. RAN WG1, No. Reno, USA, Nov. 27, 2017-Dec. 1, 2017, Nov. 18, 2017 (Nov. 18, 2017), XP051369352, 11 Pages, Retrieved from the Internet: URL: http://www.3gpp.org/ftp/tsg%5Fran/WG1%5FRL1/TSGR1%5F91/Docs/ [retrieved on Nov. 18, 2017], the whole document.

ZTE: "Further Discussion on CSI-RS based RLM", 3GPP Draft, 3GPP TSG-RAN WG4 Meeting #87, R4-1807259 Further Discussion on CSI-RS based RLM, 3rd Generation Partnership Project (3GPP), Mobile Competence Centre, 650, Route Des Lucioles, F-06921 Sophia-Antipolis Cedex, France, vol. RAN WG4, No. Busan, Korea, May 21, 2018-May 25, 2018, May 14, 2018 (May 14, 2018), XP051577450, 6 Pages, Retrieved from the Internet: URL: http://www.3gpp.org/ftp/tsg%5Fran/WG4%5FRadio/TSGR4%5F87/Docs/R4%2D1807259%2Ezip [retrieved on May 14, 2018], Paragraph [0002] Paragraph [0005] Table 1.

* cited by examiner

TRANSMISSION CONFIGURATION INDICATION STATE ORDERING FOR AN INITIAL CONTROL RESOURCE SET

CROSS REFERENCE

The present Application for patent claims the benefit of U.S. Provisional Patent Application No. 62/767,483 by ZHOU et al., entitled "TRANSMISSION CONFIGURATION INDICATION STATE ORDERING FOR AN INITIAL CONTROL RESOURCE SET," filed Nov. 14, 2018, assigned to the assignee hereof, and expressly incorporated herein.

BACKGROUND

The following relates generally to wireless communications, and more specifically to transmission configuration indication (TCI) state ordering for an initial control resource set (coreset).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station and a UE may exchange control information and data on one or more beams. In some cases, it may be appropriate for a UE to identify appropriate spatial parameters for receiving control information (e.g., in an initial coreset) from a base station. Conventional techniques for identifying appropriate spatial parameters for receiving control information from a base station may be deficient.

SUMMARY

The described techniques relate to improved methods, systems, devices, and apparatuses that support transmission configuration indication (TCI) state ordering for an initial control resource set (coreset). Generally, the described techniques provide for efficient identification of spatial parameters for receiving control information in an initial coreset. In one example, a user equipment (UE) may receive a TCI state indicating one or more reference signals quasi co-located with a control information transmission in the initial coreset, and the UE may identify a quasi co-location (QCL) relationship (e.g., the UE may identify a reference signal with a synchronization signal block (SSB) as a QCL source is quasi co-located with the control information transmission in the initial coreset, based on the TCI state). The TCI state may be identified from a set of TCI states, where the set of TCI states includes at least one TCI state corresponding to each SSB (e.g., each reference signal with an SSB as a QCL source) associated with the initial coreset. In some examples, each SSB associated with the initial coreset may correspond to or map to at least one TCI state of the set of TCI states. The UE may thus identify spatial parameters for monitoring the initial coreset for the control information transmission in accordance with the TCI state (e.g., based on a QCL relationship).

A method of wireless communication by a UE is described. The method may include receiving signaling indicating a number of SSBs associated with an initial control resource set (e.g., an initial coreset) and a TCI state ordering within a set of TCI states. The method may further include receiving signaling indicating a TCI state of the set of TCI states corresponding to the initial coreset, where the set of TCI states includes at least one TCI state corresponding to each SSB of the number of SSBs associated with the initial coreset. The method may further include identifying a channel state information reference signal (CSI-RS) associated with a SSB based on the TCI state and monitoring the initial coreset based on the TCI state.

An apparatus for wireless communication by a UE is described. The apparatus may include a processor, memory in electronic communication with the processor, and instructions stored in the memory. The instructions may be executable by the processor to cause the apparatus to receive signaling indicating a number of SSBs associated with an initial coreset and a TCI state ordering within a set of TCI states. The instructions may be executable by the processor to further cause the apparatus to receive signaling indicating a TCI state of the set of TCI states corresponding to the initial coreset, where the set of TCI states includes at least one TCI state corresponding to each SSB of the number of SSBs associated with the initial coreset. The instructions may be executable by the processor to further cause the apparatus to identify a channel state information reference signal associated with a SSB based on the TCI state, and monitor the initial coreset based on the TCI state.

Another apparatus for wireless communication by a UE is described. The apparatus may include means for receiving signaling indicating a number of SSBs associated with an initial coreset and a TCI state ordering within a set of TCI states. The apparatus may further include means for receiving signaling indicating a TCI state of the set of TCI states corresponding to the initial coreset, where the set of TCI states includes at least one TCI state corresponding to each SSB of the number of SSBs associated with the initial coreset, identifying a CSI-RS associated with a SSB based on the TCI state, and monitoring the initial coreset based on the TCI state.

A non-transitory computer-readable medium storing code for wireless communication by a UE is described. The code may include instructions executable by a processor to receive signaling indicating a number of SSBs associated with an initial coreset and a TCI state ordering within a set of TCI states. The code may further include instructions executable by a processor to receive signaling indicating a TCI state of the set of TCI states corresponding to the initial coreset, where the set of TCI states includes at least one TCI state corresponding to each SSB of the number of SSBs associated with the initial coreset, identify a CSI-RS associated with a SSB based on the TCI state, and monitor the initial coreset based on the TCI state.

Some examples of the method, apparatuses, and non-transitory computer-readable medium described herein may further include operations, features, means, or instructions for identifying spatial parameters based at least part on the transmission configuration indication state, performing channel estimate for the channel state information reference signal based at least part on the spatial parameters, and monitoring the initial control resource set based at least in part on the channel estimation.

Some examples of the method, apparatuses, and non-transitory computer-readable medium described herein may further include operations, features, means, or instructions for receiving signaling indicating a number of SSBs being transmitted in association with the initial coreset, where the set of TCI states includes at least one TCI state corresponding to each SSB of the number of SSBs. Some examples of the method, apparatuses, and non-transitory computer-readable medium described herein may further include operations, features, means, or instructions for receiving signaling indicating a number of quasi-collocated sources associated with the initial coreset, where the set of TCI states includes at least one TCI state corresponding to each quasi-collocated source of the number of quasi-collocated sources.

Some examples of the method, apparatuses, and non-transitory computer-readable medium described herein may further include operations, features, means, or instructions for receiving the SSB, and identifying the initial coreset based on the received SSB, where the initial coreset may be monitored based on the identifying. In some examples of the method, apparatuses, and non-transitory computer-readable medium described herein, the received SSB may have a quasi co-location relationship with a reference signal of the indicated TCI state.

Some examples of the method, apparatuses, and non-transitory computer-readable medium described herein may further include operations, features, means, or instructions for receiving signaling indicating TCI state ordering, where the TCI state ordering includes at least one TCI state corresponding to each SSB associated with the initial coreset, and identifying the TCI state of a set of TCI states based on the received signaling indicating TCI state ordering and the received signaling indicating a TCI state. In some examples of the method, apparatuses, and non-transitory computer-readable medium described herein, the indicated TCI state indicates a configuration of first and second reference signals that may have a quasi co-location relationship and a quasi co-location type associated with the SSB.

A method of wireless communication by a base station is described. The method may include identifying a number of SSBs associated with an initial coreset and a TCI state ordering within a set of TCI states. The method may further include identifying a TCI state of the set of TCI states corresponding to the initial coreset, where the set of TCI states includes at least one TCI state corresponding to each SSB associated with the initial coreset. The method may further include transmitting signaling indicating the identified TCI state and transmitting signaling over the initial coreset based on the TCI state.

An apparatus for wireless communication by a base station is described. The apparatus may include a processor, memory in electronic communication with the processor, and instructions stored in the memory. The instructions may be executable by the processor to cause the apparatus to identify a number of SSBs associated with an initial coreset and a TCI state ordering within a set of TCI states. The instructions may be executable by the processor to further cause the apparatus to identify a TCI state of the set of TCI states corresponding to the initial coreset, where the set of TCI states includes at least one TCI state corresponding to each SSB of the number of SSBs associated with the initial coreset. The instructions may be executable by the processor to further cause the apparatus to transmit signaling indicating the identified TCI state and transmit signaling over the initial coreset based on the TCI state.

Another apparatus for wireless communication by a base station is described. The apparatus may include means for identifying a number of SSBs associated with an initial coreset and a TCI state ordering within a set of TCI states. The apparatus may further include means for identifying a TCI state of the set of TCI states corresponding to the initial coreset, where the set of TCI states includes at least one TCI state corresponding to each SSB of the number of SSBs associated with the initial coreset, transmitting signaling indicating the identified TCI state, and transmitting signaling over the initial coreset based on the TCI state.

A non-transitory computer-readable medium storing code for wireless communication by a base station is described. The code may include instructions executable by a processor to identify a number of SSBs associated with an initial coreset and a TCI state ordering within a set of TCI states. The code may further include instructions executable by a processor to identify a TCI state of the set of TCI states corresponding to the initial coreset, where the set of TCI states includes at least one TCI state corresponding to each SSB of the number of SSBs associated with the initial coreset, transmit signaling indicating the identified TCI state, and transmit signaling over the initial coreset based on the TCI state.

Some examples of the method, apparatuses, and non-transitory computer-readable medium described herein may further include operations, features, means, or instructions for determining a number of SSBs being transmitted in association with the initial coreset, and transmitting signaling indicating the number, where the set of TCI states includes at least one TCI state corresponding to each SSB of the number of SSBs. Some examples of the method, apparatuses, and non-transitory computer-readable medium described herein may further include operations, features, means, or instructions for determining a number of quasi-collocated sources associated with the initial coreset, and transmitting signaling indicating the number, where the set of TCI states includes at least one TCI state corresponding to each quasi-collocated source of the number of quasi-collocated sources.

Some examples of the method, apparatuses, and non-transitory computer-readable medium described herein may further include operations, features, means, or instructions for transmitting a SSB, where the SSB indicates the initial coreset. Some examples of the method, apparatuses, and non-transitory computer-readable medium described herein may further include operations, features, means, or instructions for identifying a TCI state ordering, where the TCI state ordering includes at least one TCI state corresponding to each SSB associated with the initial coreset, and transmitting signaling indicating the TCI state ordering.

DETAILED DESCRIPTION

Figure 1:
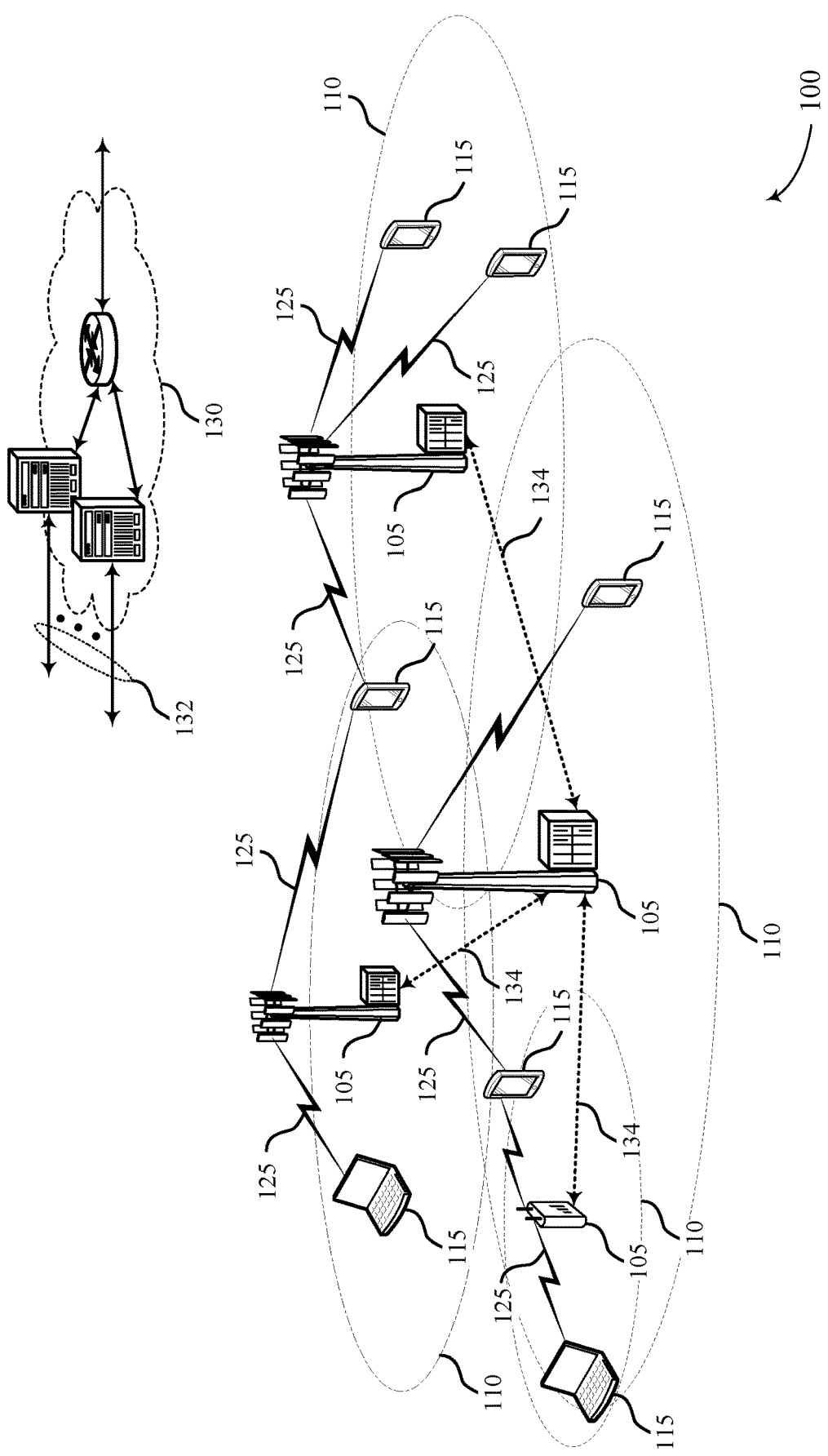
FIGS. 1 and 2 illustrate examples of wireless communications systems that support transmission configuration indication (TCI) state ordering for an initial control resource set (coreset) in accordance with aspects of the present disclosure.

In some wireless communications systems, a base station and a user equipment (UE) may exchange control information and data. In such systems, for a control information transmission (e.g., a downlink control information transmission), it may be appropriate for a UE to identify appropriate spatial parameters for receiving the control information transmission. For instance, it may be appropriate for the UE to identify a delay spread, a Doppler shift, a suitable beam, etc, for receiving the control information transmission. Accordingly, the UE may identify spatial parameters (e.g., a quasi co-locaiton (QCL) type, a delay spread, a doppler shift, etc. for a suitable beam) for receiving a control information transmission, based on a QCL relationship between the control information transmission and another transmission (e.g., a reference signal transmission). However, conventional techniques for identifying such spatial parameters for receiving a control information transmission in an initial control resource set (coreset) may be deficient.

For example, information for a coreset may include the number of resource blocks (RBs), frequency location information, the number of orthogonal frequency division multiplexing (OFDM) symbols, etc. for control information. A coreset may further be associated with several (e.g., 64) transmission configuration indication (TCI) states (e.g., a set of TCI states), where a TCI state may indicate spatial parameters for receiving control information in a coreset. A TCI state may be associated with a synchronization signal block (SSB) and may indicate QCL relationships between UE received reference signals and the control information transmissions. For example, each SSB may be associated with three TCI states of the set of TCI states each indicating at least one of three different channel state information reference signals (CSI-RSs) with the SSB as a QCL source. As such, each TCI state of the set of TCI states may indicate spatial parameters for receiving control information in a coreset via the QCL source (e.g., or the SSB) and the channel state reference signal (e.g., or the CSI-RS) associated with the TCI state.

However, in some cases, the number of TCI states corresponding to SSBs associated with a default CORESET, for example such as an initial coreset (e.g., the number of TCI states corresponding to SSBs that could be transmitted in association with the initial coreset or that could indicate CORESET #0 information), may exceed the number of TCI states in the set of TCI states associated with the default CORESET. For example, the set of TCI states applicable to CORESET #0 may include the first 64 TCI states, each of which indicates at least one CSI-RS with an SSB as a QCL source. As each SSB may be associated with three TCI states (e.g., each indicating at least one of three different CSI-RSs), the set of TCI states may be limited to 22 SSBs (e.g., as 21 SSBs may be associated with 63 TCI states, leaving a single remaining TCI state for the $22^{nd}$ SSB). In some cases, the number of SSBs that could be transmitted in association with the initial coreset (e.g., the number of SSBs that could indicate CORESET #0 information via a master information block (MIB) of each SSB) may exceed such a limitation (e.g., there may be 23 or more SSBs associated with the CORESET #0). As such, any additional SSBs (e.g., any SSBs that could be transmitted in association with the initial coreset in excess of the first 22 SSBs) may be mapped to remaining TCI states after the TCI states included in the set of TCI states (e.g., the $23^{rd}$ or following SSBs may be mapped to remaining TCI states after the 64th TCI state). Hence, these additional SSBs may not be usable for CORESET #0 indication.

The described techniques may provide for TCI state ordering for an initial coreset, where TCI states of the set of TCI states may be ordered such that each SSB (e.g., each SSB associated with the initial coreset) may appear at least once as a CSI-RS QCL source (e.g., within the first 64 sorted TCI states). In some examples, TCI state ordering may refer to a mapping between the set of TCI states and each SSB associated with the initial coreset (e.g., a mapping between TCI states and SSB indexes). Therefore, any given SSB associated with the initial coreset may be used as the QCL source (e.g., via the one or more TCI states, included in the set of TCI states, that correspond to the any given SSB). As described herein, a wireless communications system may support efficient techniques for identifying and conveying spatial parameters for receiving control information communication in an initial coreset (e.g., CORESET #0). In one example, a UE may receive a TCI state indicating reference signals quasi co-located with a control information transmission in an initial coreset (e.g., the UE may identify a CSI-RS associated with a SSB that is quasi co-located with a control information transmission in CORESET #0, based at least in part on the TCI state). The TCI state may be identified from a set of TCI states, where the set of TCI states includes at least one TCI state corresponding to each SSB (e.g., each QCL source) associated with the initial coreset. As such, the UE may identify spatial parameters for monitoring the initial coreset for the control information transmission in accordance with the TCI state. The set of TCI states inclusion of at least one TCI state corresponding to each SSB (e.g., each QCL source) associated with the initial coreset may ensure UEs may identify appropriate spatial parameters for monitoring the initial coreset using any SSB (e.g., any QCL source) associated with the initial coreset.

Aspects of the disclosure are initially described in the context of a wireless communications system. Process flows for implementing the discussed techniques are then described. Aspects of the disclosure are further illustrated by and described with reference to apparatus diagrams, system diagrams, and flowcharts that relate to TCI state ordering for an initial coreset.

FIG. 1 illustrates an example of a wireless communications system 100 that supports configuring TCI states for an initial coreset in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro cell eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors, each making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical communication entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low-cost or low-complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of the base station 105, or be otherwise unable to receive transmissions from the base station 105. In some cases, a group of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another either directly (e.g., directly between base stations 105) over backhaul links 134 (e.g., via an X2, Xn, or other interface) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to one of the Internet, Intranet(s), and an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the radio frequency spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed radio frequency spectrum band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed radio frequency spectrum bands may be based on a carrier aggregation configuration in conjunction with component carriers operating in a licensed radio frequency spectrum band (e.g., LAA). Operations in unlicensed spectrum may include downlink transmissions, uplink transmissions, peer-to-peer transmissions, or a combination of these. Duplexing in unlicensed radio frequency spectrum bands may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamformed communications. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum bands or shared spectrum bands (e.g., where more than one operator is allowed to use the spectrum bands). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum bands may increase spectrum utilization and spectral efficiency, specifically through dynamic vertical (e.g., across the frequency domain) and horizontal (e.g., across the time domain) sharing of resources.

In some wireless communications systems, a base station 105 and a UE 115 may exchange control information and data. In such systems, for a downlink control information transmission, it may be appropriate for a UE 115 to identify appropriate spatial parameters for receiving the control information transmission. For instance, it may be appropriate for the UE 115 to identify a delay spread, a Doppler shift, etc. for receiving the control information transmission and a suitable beam for receiving the control information transmission. Accordingly, the UE 115 may identify spatial parameters for receiving a control information transmission based on a QCL relationship between the control information transmission and another transmission (e.g., a reference signal transmission).

However, conventional techniques for identifying such spatial parameters for receiving a control information transmission in an initial coreset may be deficient. For example, TCI states applicable to CORESET #0 may include the first 64 TCI states each indicating at least one CSI-RS with an SSB as a QCL source (e.g., a bit sequence for indicating a TCI state for CORESET #0 in information for CORESET #0 may be limited to, for example, 6 bits that may indicate up to 64 values or 64 different TCI states). TCI states applicable to CORESET #0 may be (1) up to the first 64 TCI states sorted by TCI-state IDs, and (2) each indicative of at least one CSI-RS sourced from an SSB. However, those 64 TCI states may not capture all SSBs if there are multiple TCI states each indicating at least one CSI-RS with the same SSB as a QCL source. As such, CORESET #0 may not be indicatable by some SSB in such cases. For example, a base station 105 may transmit several (e.g., 20, 30, 40, etc.) SSBs associated with (e.g., including MIBs that point to) an initial coreset (e.g., CORESET #0). A set of TCI states applicable to the initial coreset may include TCI states up to the first 64 TCI states sorted by TCI-state IDs each of which indicates at least one CSI-RS sourced from an SSB, where each SSB is associated with three of the first 64 TCI states including three different CSI-RSs (e.g., with the same SSB as the QCL source). Depending on the ordering of the set of TCI states (e.g., depending on how TCI state are ordered), the first 64 TCI states, each of which indicating at least one CSI-RS with an SSB as a QCL source, may not capture all SSBs.

For example, in cases where 32 SSBs are associated with the initial coreset, if the set of TCI states is ordered as 3 TCIs for SSB 1 (e.g., TCI states 1, 2, and 3 mapped to SSB 1 QCL source), then 3 TCIs for SSB 2 (e.g., TCI states 4, 5, and 6 mapped to SSB 2 QCL source), then 3 TCIs for SSB3, and so on, in such cases, only 22 SSBs are captured by the first 64 TCI states, instead of total 32 SSBs. As such, the remaining SSBs (e.g., from SSB 23 to SSB 32) may have to be mapped to remaining TCI states after TCI state 64. Hence these SSBs may not be usable for CORESET #0 indication. Wireless communications system 100 may support efficient techniques for identifying spatial parameters for receiving control information in an initial coreset (e.g., based on TCI state ordering that includes at least one TCI state for each QCL source or SSB associated with the initial coreset). In the present example where 32 SSBs are associated with the initial coreset, the described techniques may map two TCI states (of the first 64 TCI states) to each SSB and map the remaining TCI states (e.g., the remaining 32 TCI states, from TCI state 65 to TCI state 96, each associated with one of the 32 SSBs) again to the 32 SSBs. For example, TCI state 1 and TCI state 2 are mapped to SSB1 QCL source, TCI state 2 and TCI state 3 are mapped to SSB 2 QCL source, and so on, till TCI state 63 and TCI state 64 are mapped to SSB 32 QCL source. Then remaining TCI states (e.g., TCI states that may be associated with other coresets, TCI states that are not within the set of TCI states applicable to the initial coreset, etc.) may be mapped accordingly. For example, TCI state 65 may be mapped to SSB 1, TCI state 66 mapped to SSB2, and so on, till TCI state 96 may be mapped to SSB 32.

Figure 2:
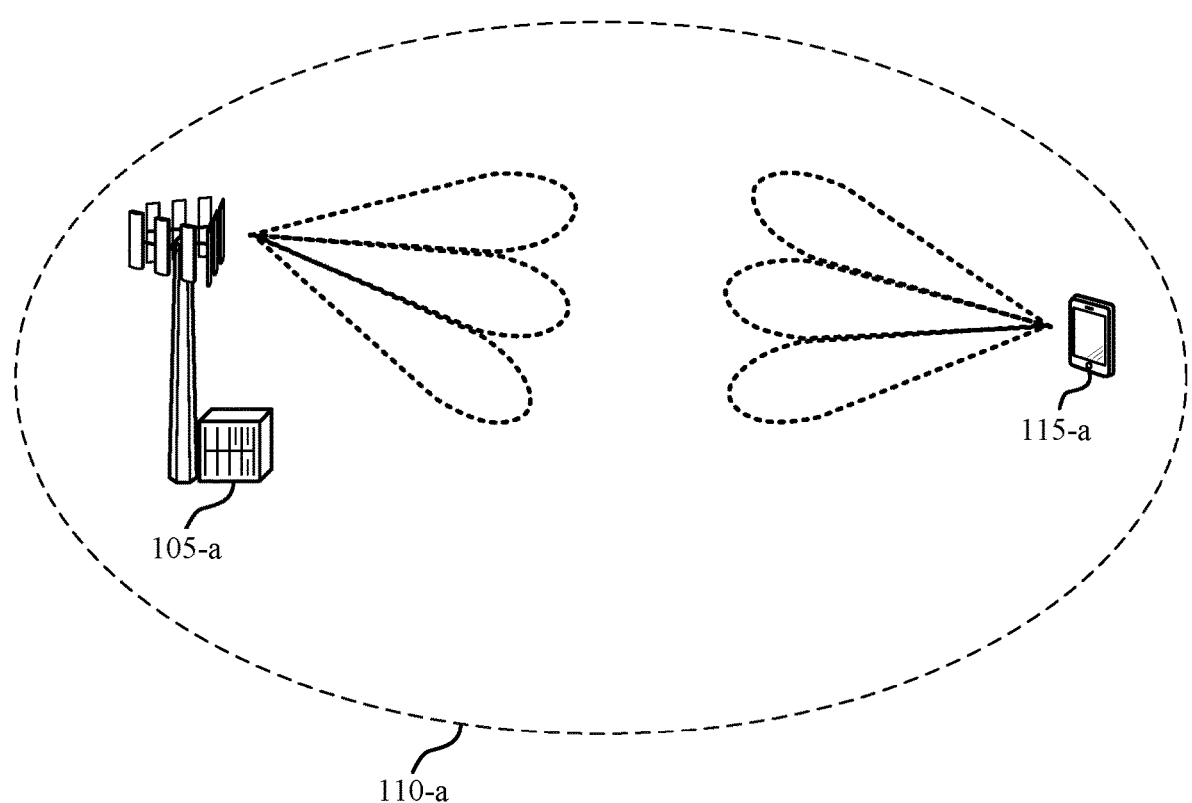

FIG. 2 illustrates an example of a wireless communications system 200 that supports TCI state ordering for an initial coreset in accordance with aspects of the present disclosure. In some examples, wireless communications system 200 may implement aspects of wireless communication system 100. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 200 may implement aspects of wireless communications system 100. For example, wireless communications system 200 may support efficient techniques for identifying spatial parameters for receiving control information in an initial coreset (e.g., CORESET #0).

In one example, UE 115-a may receive a TCI state indicating reference signals quasi co-located with a control information transmission in an initial coreset (e.g., CORESET #0). The UE 115-a may identify a QCL relationship between a CSI-RS (e.g., associated with the SSB or QCL source) and the control information transmission in the initial coreset. The UE 115-a may thus identify spatial parameters for monitoring the initial coreset for the control information transmission in accordance with the TCI state or the QCL relationship.

Wireless communications system 200 may provide for TCI state ordering for an initial coreset, where TCI states of a set of TCI states (e.g., a set of 64 TCI states applicable to CORESET #0) may be ordered such that each SSB (e.g., each SSB associated with the initial coreset) may appear at least once as CSI-RS QCL source (e.g., within the first 64 sorted TCI states). Therefore, any given SSB associated with the initial coreset may be used as the QCL source (e.g., via the one or more TCI states, included in the set of TCI states, that correspond to the any given SSB). As described herein, wireless communications system 200 may support efficient techniques for identifying and conveying spatial parameters for receiving control information communication in an initial coreset (e.g., CORESET #0). In one example, UE 115-a may receive a TCI state indicating reference signals quasi co-located with a control information transmission in an initial coreset (e.g., the UE may identify a CSI-RS associated with a SSB that is quasi co-located with a control information transmission in CORESET #0 based at least in part on the TCI state). The TCI state may be identified from a set of TCI states, where the set of TCI states includes at least one TCI state corresponding to each SSB (e.g., each QCL source) associated with the initial coreset. As such, the UE may identify spatial parameters for monitoring the initial coreset for the control information transmission in accordance with the TCI state. The set of TCI states inclusion of at least one TCI state corresponding to each SSB (e.g., each QCL source) associated with the initial coreset may ensure UEs may identify appropriate spatial parameters for monitoring the initial coreset using any SSB (e.g., any QCL source) associated with the initial coreset.

For example, base station 105-*a* may transmit several (e.g., 30, 40, etc.) SSBs associated with (e.g., including MIBs that point to) an initial coreset (e.g., CORESET #0). A set of TCI states applicable to the initial coreset may include TCI states up to the first 64 TCI states sorted by TCI-state IDs each of which indicates at least one CSI-RS sourced from an SSB, as well as at least one TCI state corresponding to each SSB associated with the initial coreset (e.g., such that each SSB must appear at least once as CSI-RS QCL source within the first 64 sorted TCI states). That is, the TCI states applicable to the CORESET #0 may be (1) up to the first 64 sorted by TCI-state IDs, and (2) each indicative of at least one CSI-RS sourced from an SSB, such that (3) each SSB appears at least once as CSI-RS QCL source within the first 64 sorted TCI states. In one example, 32 SSBs may be associated with an initial coreset transmission (e.g., base station 105-*a* may transmit 32 SSBs with MIBs indicating the initial coreset). For any given SSB X (e.g., an integer value), there may be three TCI states each indicating at least one of three different CSI-RSs with SSB X as the QCL source (e.g., source of the spatial parameters associated with the reference signals, or the three CSI-RSs). A set of TCI states applicable to the initial coreset may be ordered such that each SSB appears at least once as a CSI-RS QCL source within the set of TCI states (e.g., the first 64 sorted states applicable to the initial coreset) as shown below:

TCI 1 for SSB 1, TCI 1 for SSB 2, TCI 1 for SSB 3, . . . , TCI 1 for SSB32, TCI 2 for SSB 1, TCI 2 for SSB TCI 2, . . . , for SSB32, TCI 3 for SSB 1, . . . , TCI 3 for SSB32 up to the 64th TCI state (e.g., for TCI state 1 up to TCI state 64). As such, all 32 SSBs may be captured in first 64 TCI states (e.g., each of the 32 SSBs may correspond to at least one TCI state in the set of TCI states). It should be noted that other orderings may be implemented by analogy, without departing from the scope of the present disclosure. For example, TCI states associated with an SSB may be prioritized in any number of ways, where the higher priority TCI states for each SSB are sequentially ordered for the set of TCI states, until the limit of the set of TCI states is reached (e.g., up until the $64^{th}$ TCI state, up until the $2^n$th TCI state when an n bit sequence is used for indicating a TCI state for an initial coreset, etc.). As such, various numbers of SSBs may be associated with an initial coreset, and the set of TCI states applicable to the initial coreset may ordered such that each SSB appears at least once as CSI-RS QCL source within the sorted set of TCI states (e.g., within the sorted set of TCI states applicable to the initial coreset).

Figure 3:
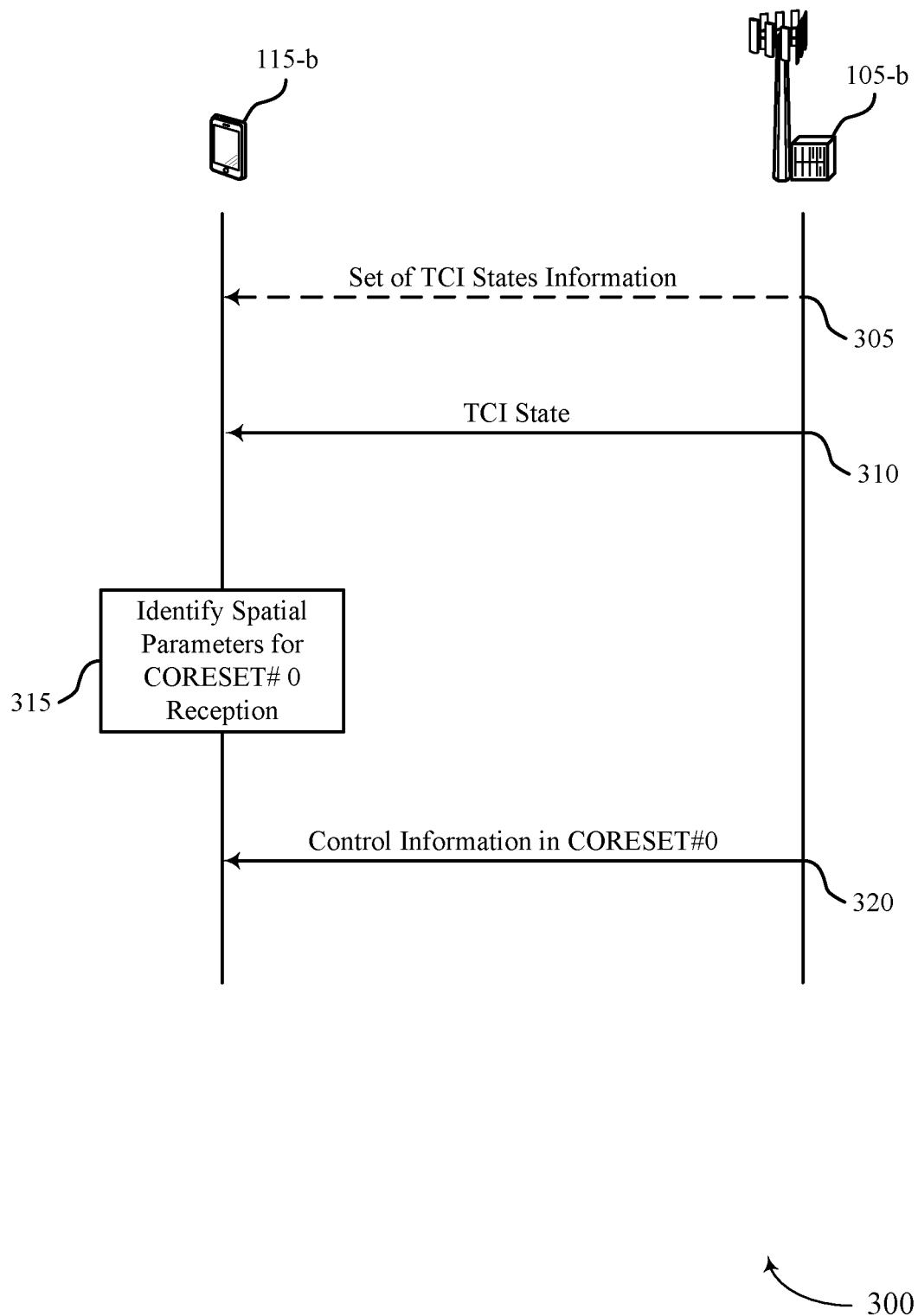
FIG. 3 illustrates an example of a process flow that supports TCI state ordering for an initial coreset in accordance with aspects of the present disclosure.

FIG. 3 illustrates an example of a process flow 300 that supports TCI state ordering for an initial coreset in accordance with aspects of the present disclosure. In some examples, process flow 300 may implement aspects of wireless communication system 100. Process flow 300 illustrates aspects of techniques performed by a base station 105-*b*, which may be an example of a base station 105 described with reference to FIGS. 1 and 2. Process flow 300 also illustrates aspects of techniques performed by UE 115-*b*, which may be an example of a UE 115 described with reference to FIGS. 1 and 2. In the following description of the process flow 300, the operations between the base station 105-*b* and the UE 115-*b* may be transmitted in a different order than the exemplary order shown, or the operations performed base station 105-*b* and UE 115-*b* may be performed in different orders or at different times. In some cases, certain operations may also be left out of the process flow 300, or other operations may be added to the process flow 300.

At 305, base station 105-*b* may optionally transmit signaling pertaining to the set of TCI states (e.g., the set of TCI states applicable to the initial coreset). For example, in some cases, the UE 115-*b* may receive the signaling at 305 indicating a number of SSBs being transmitted in association with the initial coreset (e.g., the signaling indicating a number of SSBs base station 105-*b* may transmit in association with, or with a MIB pointing to, the transmission of the initial coreset. In some cases, the signaling at 305 may include information pertaining to a number of quasi-collocated sources associated with the initial control resource set. In some cases, the UE 115-*b* may receive the signaling at 305 indicating TCI state ordering within the set of TCI states (e.g., the UE 115-*b* may receive the signaling indicating the ordering of TCI states within the set of TCI states, where the ordering includes at least one TCI state corresponding to each SSB associated with the initial coreset).

At 310, base station 105-*b* may transmit signaling indicating a TCI state to UE 115-*b* corresponding to an initial coreset. In some cases, the signaling may include an indication of the TCI state may be a TCI-StateId field in a MAC-CE (e.g., that in some cases may indicate a TCI state in a PDSCH-Config (e.g., an information element in RRC signaling)). UE 115-*b* may receive the signaling indicating the TCI state of a set of TCI states corresponding to an initial coreset (e.g., where the set of TCI states includes at least one TCI state corresponding to each SSB associated with the initial coreset).

At 315, UE 115-*b* may identify a QCL relationship (e.g., for identifying spatial parameters for receiving the control transmission in the coreset) based on the indication received at 310. For example, the UE 115-*b* may identify a CSI-RS associated with a SSB based at least in part on the TCI state indication received at 310. Besides, UE 115-*b* may determine spatial parameters for monitoring (e.g., through a channel estimate for the identified CSI-RS based on the spatial parameters) the initial coreset for control information using the indicated TCI state or the identified QCL relationship. As the set of TCI states may include at least one TCI state corresponding to each SSB associated with the initial coreset, the coreset may be indicated using any SSB associated with the coreset (e.g., the coreset may be indicated in a MIB or other field of the any SSB transmitted by base station 105-*b*, as the set of TCI states may be ordered such that each SSB appears at least once as a QCL source).

At 320, UE 115-*b* may monitor the initial coreset (e.g., CORESET #0) for control information based at least in part on the indicated TCI state (e.g., and the determined spatial parameters).

Figure 4:
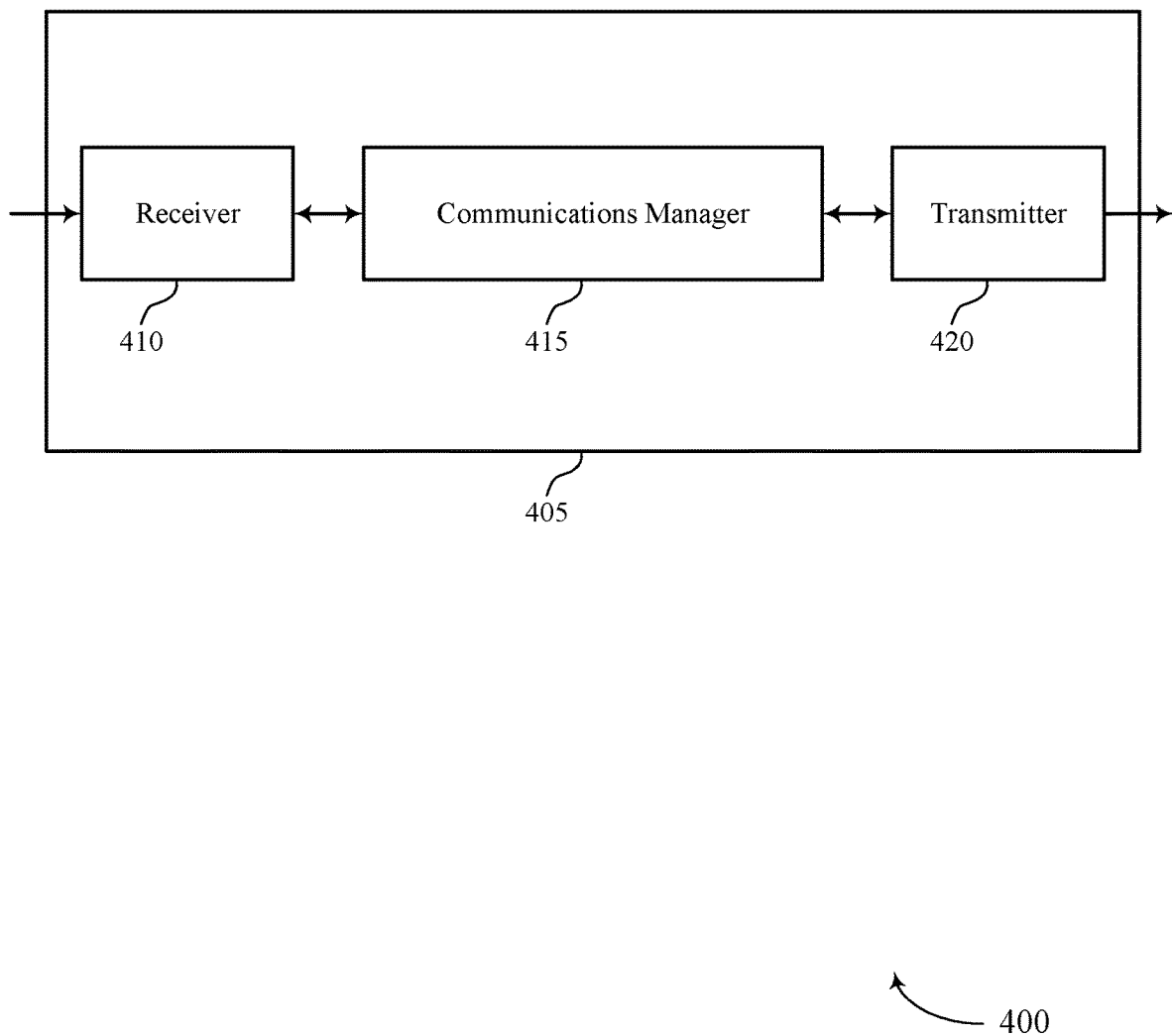
FIGS. 4 and 5 show block diagrams of devices that support TCI state ordering for an initial coreset in accordance with aspects of the present disclosure.

FIG. 4 shows a block diagram 400 of a device 405 that supports TCI state ordering for an initial coreset in accordance with aspects of the present disclosure. The device 405 may be an example of aspects of a UE 115 as described herein. The device 405 may include a receiver 410, a communications manager 415, and a transmitter 420. The device 405 may also include a processor (not shown). Each of these components may be in communication with one another (e.g., via one or more buses).

The receiver 410 may receive information such as packets, user data, or control information associated with various information channels (e.g., control channels, data channels, and channels for information related to TCI state ordering for an initial coreset, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive signaling indicating a number of SSBs associated with an initial coreset and a TCI state ordering within a set of TCI states. The communications manager 415 may receive signaling indicating a TCI state of a set of TCI states corresponding to an initial coreset, where the set of TCI states includes at least one TCI state corresponding to each SSB associated with the initial coreset, identify a CSI-RS (e.g., or other reference signal) associated with a SSB based on the TCI state, and monitor the initial coreset based on the TCI state. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
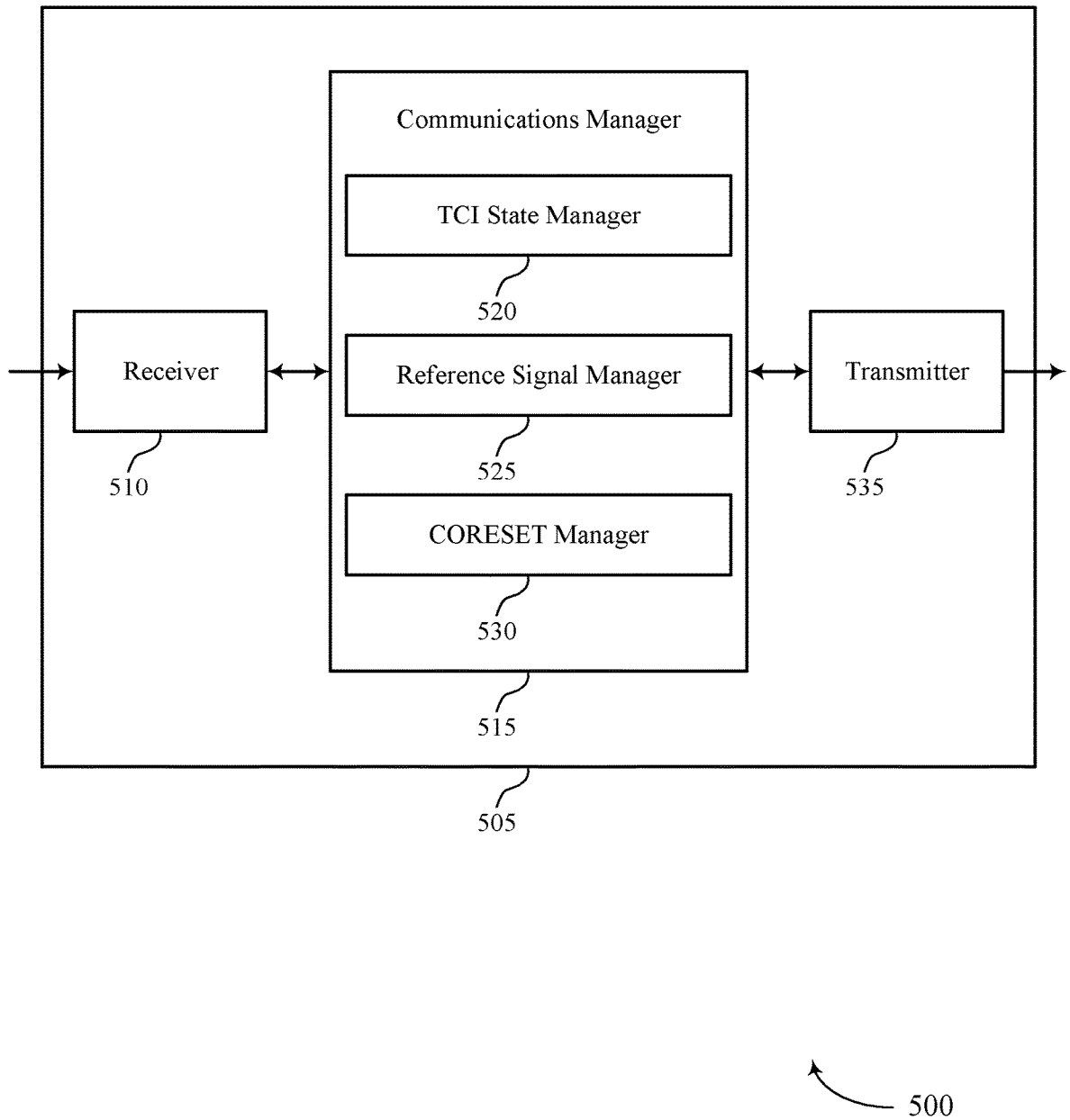

FIG. 5 shows a block diagram 500 of a device 505 that supports TCI state ordering for an initial coreset in accordance with aspects of the present disclosure. The device 505 may be an example of aspects of a device 405, or a UE 115 as described herein. The device 505 may include a receiver 510, a communications manager 515, and a transmitter 535. The device 505 may also include a processor (not shown). Each of these components may be in communication with one another (e.g., via one or more buses).

The receiver 510 may receive information such as packets, user data, or control information associated with various information channels (e.g., control channels, data channels, and channels for information related to TCI state ordering for an initial coreset, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a TCI state manager 520, a reference signal manager 525, and a CORESET manager 530. The communications manager 515 may be an example of aspects of the communications manager 710 described herein.

The TCI state manager 520 may receive signaling indicating a number of SSBs associated with an initial coreset and a TCI state ordering within a set of TCI states. The TCI state manager 520 may receive signaling indicating a TCI state of a set of TCI states corresponding to an initial coreset, where the set of TCI states includes at least one TCI state corresponding to each SSB associated with the initial coreset. The reference signal manager 525 may identify a CSI-RS associated with a SSB based on the TCI state. The CORESET manager 530 may monitor the initial coreset based on the TCI state.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
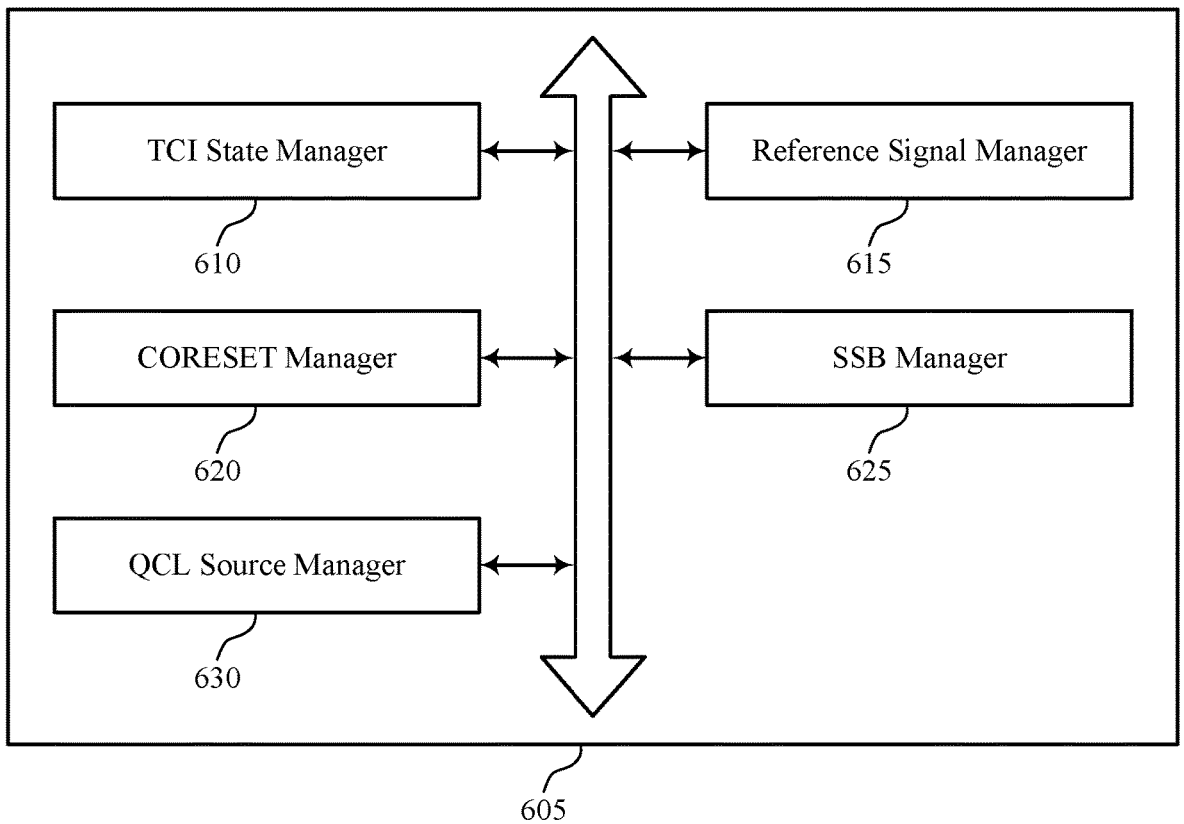
FIG. 6 shows a block diagram of a communications manager that supports TCI state ordering for an initial coreset in accordance with aspects of the present disclosure.

FIG. 6 shows a block diagram 600 of a communications manager 605 that supports TCI state ordering for an initial coreset in accordance with aspects of the present disclosure. The communications manager 605 may be an example of aspects of a communications manager 415, a communications manager 515, or a communications manager 710 described herein. The communications manager 605 may include a TCI state manager 610, a reference signal manager 615, a CORESET manager 620, a SSB manager 625, and a QCL source manager 630. Each of these modules may communicate, directly or indirectly, with one another (e.g., via one or more buses).

The TCI state manager 610 may receive signaling indicating a number of SSBs associated with an initial coreset and a TCI state ordering within a set of TCI states. The TCI state manager 610 may receive signaling indicating a TCI state of a set of TCI states corresponding to an initial coreset, where the set of TCI states includes at least one TCI state corresponding to each SSB associated with the initial coreset. In some examples, the TCI state manager 610 may receive signaling indicating TCI state ordering, where the TCI state ordering includes at least one TCI state corresponding to each SSB associated with the initial coreset. In some examples, the TCI state manager 610 may identify the TCI state of a set of TCI states based on the received signaling indicating TCI state ordering and the received signaling indicating a TCI state. In some cases, the indicated TCI state indicates a configuration of first and second reference signals that have a QCL relationship and a QCL type associated with the SSB.

The reference signal manager 615 may identify a CSI-RS associated with a SSB based on the TCI state. In some examples, the reference signal manager 615 may identify spatial parameters based on the TCI state, perform a channel estimate for the channel state information reference signal based at least part on the spatial parameters, and monitor the initial control resource set based at least in part on the channel estimation.

The CORESET manager 620 may monitor the initial coreset based on the TCI state.

The SSB manager 625 may receive signaling indicating a number of SSBs being transmitted in association with the initial coreset, where the set of TCI states includes at least one TCI state corresponding to each SSB of the number of SSBs. In some examples, the SSB manager 625 may receive the SSB. In some examples, the SSB manager 625 may identify the initial coreset based on the received SSB, where the initial coreset is monitored based on the identifying. In some cases, the received SSB has a QCL relationship with a reference signal of the indicated TCI state.

The QCL source manager 630 may receive signaling indicating a number of quasi-collocated sources associated with the initial coreset, where the set of TCI states includes at least one TCI state corresponding to each quasi-collocated source of the number of quasi-collocated sources.

Figure 7:
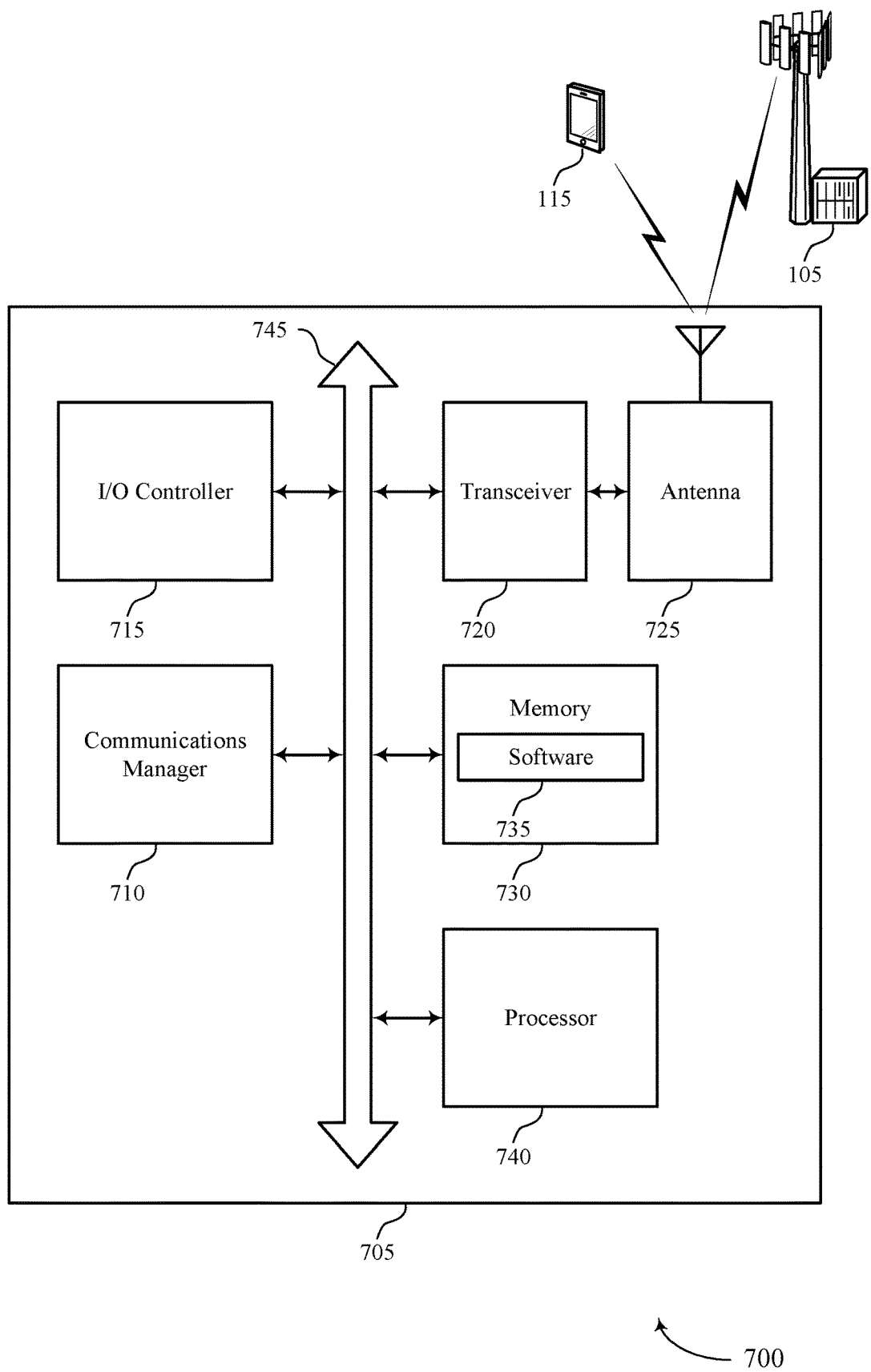
FIG. 7 shows a diagram of a system including a device that supports TCI state ordering for an initial coreset in accordance with aspects of the present disclosure.

FIG. 7 shows a diagram of a system 700 including a device 705 that supports TCI state ordering for an initial coreset in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive signaling indicating a TCI state of a set of TCI states corresponding to an initial coreset, where the set of TCI states includes at least one TCI state corresponding to each SSB associated with the initial coreset, identify a CSI-RS associated with a SSB based on the TCI state, and monitor the initial coreset based on the TCI state.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code or software 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting TCI state ordering for an initial coreset).

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
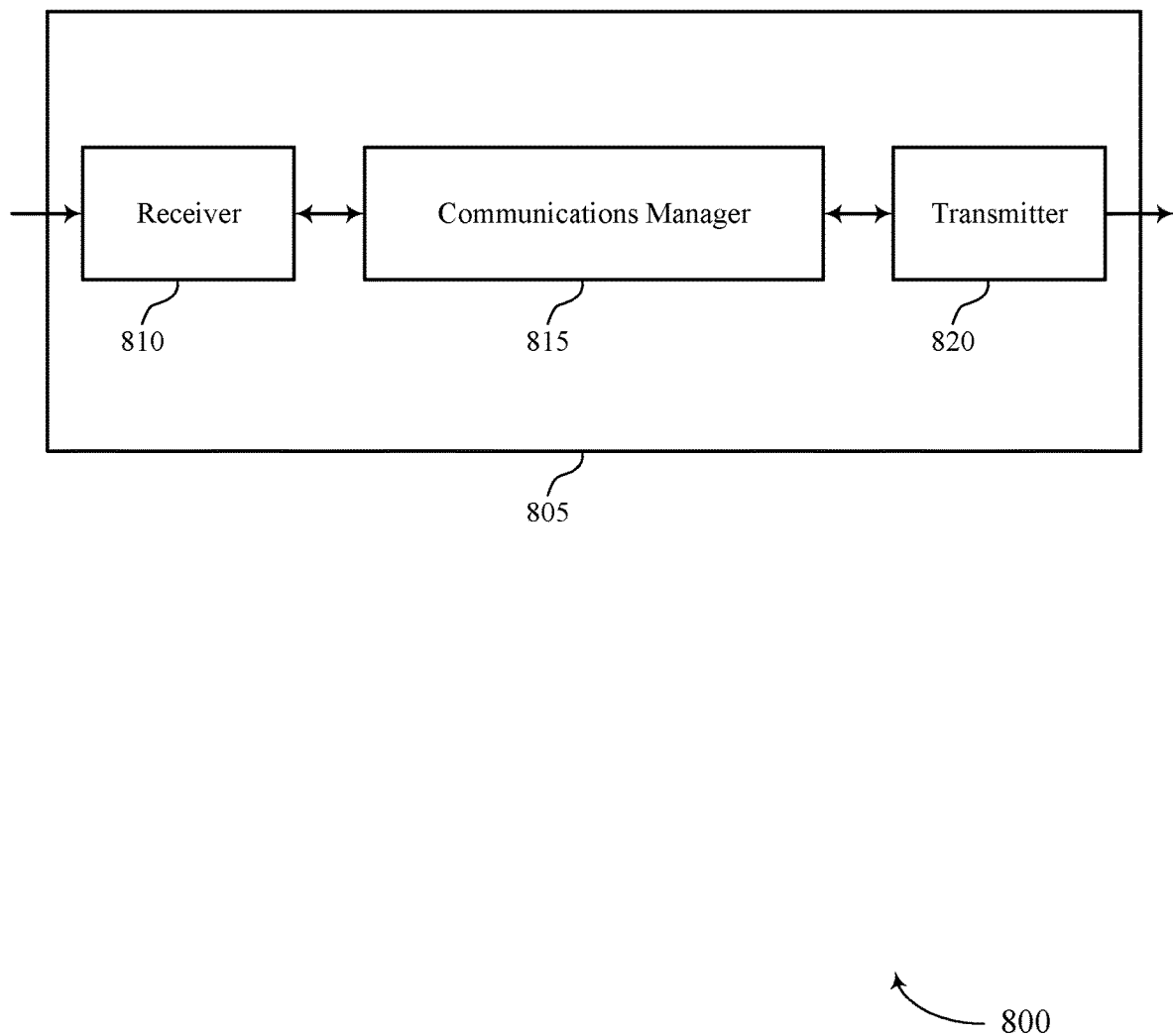
FIGS. 8 and 9 show block diagrams of devices that support TCI state ordering for an initial coreset in accordance with aspects of the present disclosure.

FIG. 8 shows a block diagram 800 of a device 805 that supports TCI state ordering for an initial coreset in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to TCI state ordering for an initial coreset, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a TCI state of a set of TCI states corresponding to an initial coreset, where the set of TCI states includes at least one TCI state corresponding to each SSB associated with the initial coreset, transmit signaling indicating the identified TCI state, and transmit signaling over the initial coreset based on the TCI state. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
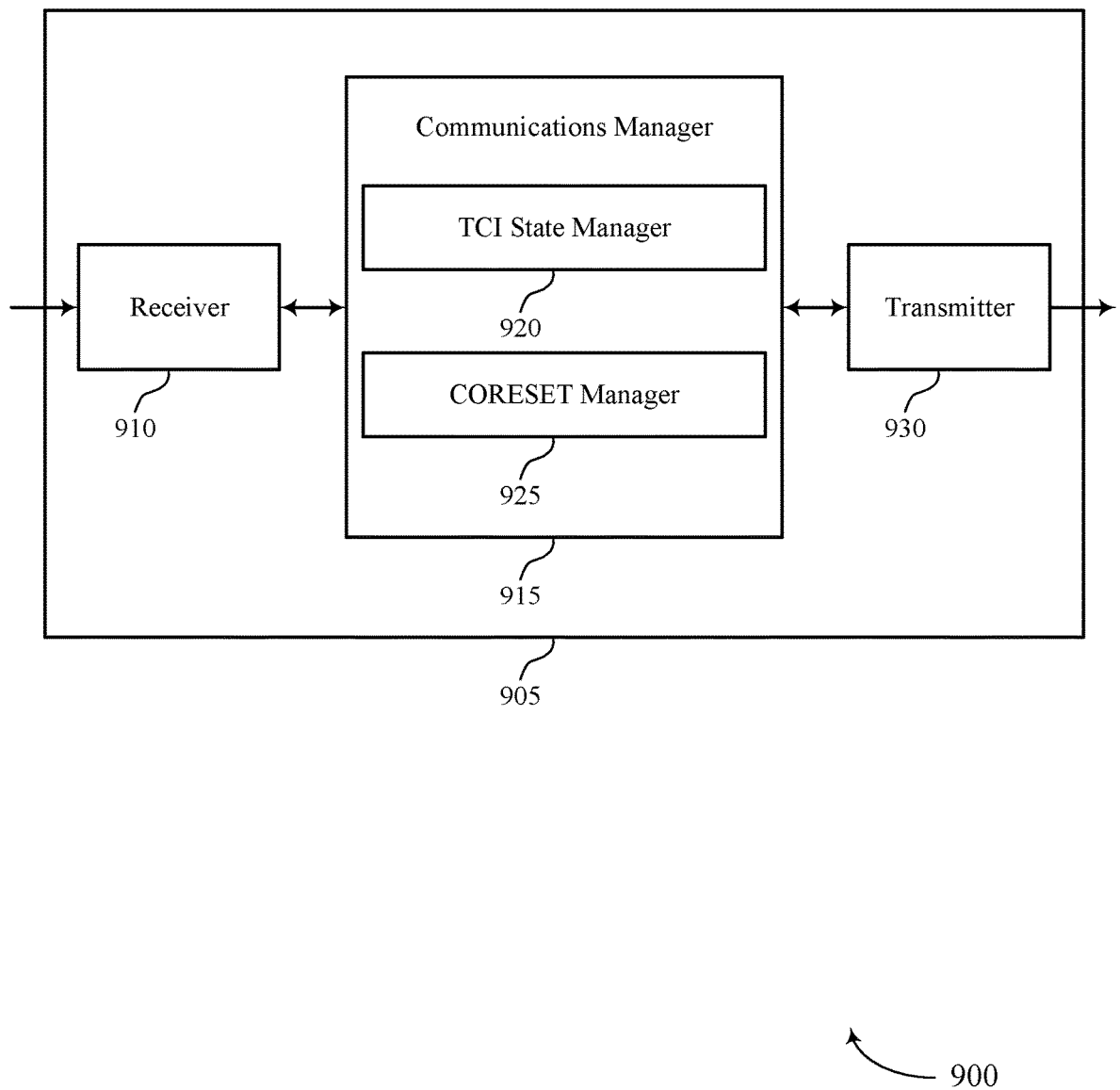

FIG. 9 shows a block diagram 900 of a device 905 that supports TCI state ordering for an initial coreset in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to TCI state ordering for an initial coreset, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a TCI state manager 920 and a CORESET manager 925. The communications manager 915 may be an example of aspects of the communications manager 1110 described herein.

The TCI state manager 920 may identify a TCI state of a set of TCI states corresponding to an initial coreset, where the set of TCI states includes at least one TCI state corresponding to each SSB associated with the initial coreset and transmit signaling indicating the identified TCI state.

The CORESET manager 925 may transmit signaling over the initial coreset based on the TCI state.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
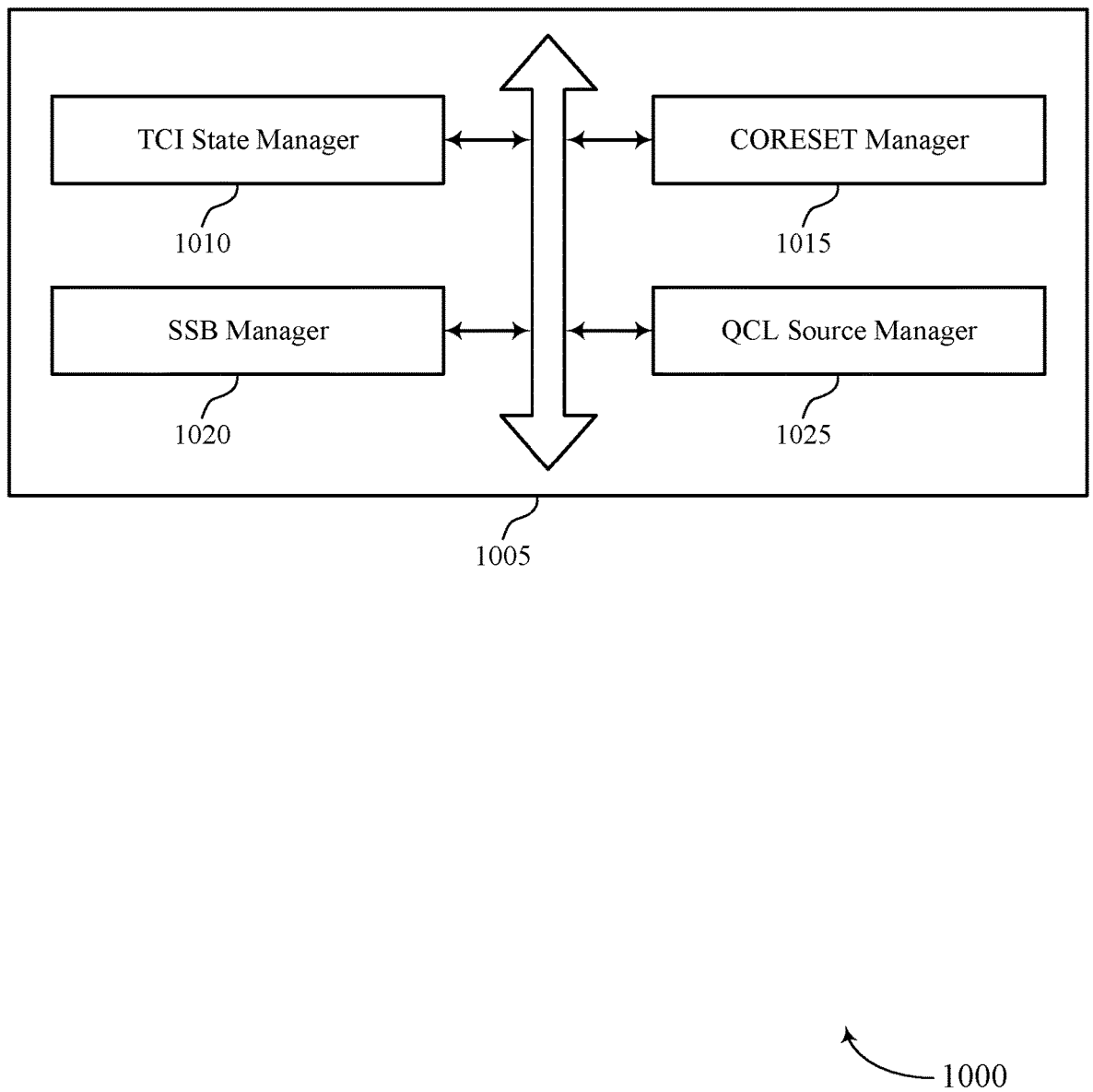
FIG. 10 shows a block diagram of a communications manager that supports TCI state ordering for an initial coreset in accordance with aspects of the present disclosure.

FIG. 10 shows a block diagram 1000 of a communications manager 1005 that supports TCI state ordering for an initial coreset in accordance with aspects of the present disclosure. The communications manager 1005 may be an example of aspects of a communications manager 815, a communications manager 915, or a communications manager 1110 described herein. The communications manager 1005 may include a TCI state manager 1010, a CORESET manager 1015, a SSB manager 1020, and a QCL source manager 1025. Each of these modules may communicate, directly or indirectly, with one another (e.g., via one or more buses).

The TCI state manager 1010 may identify a TCI state of a set of TCI states corresponding to an initial coreset, where the set of TCI states includes at least one TCI state corresponding to each SSB associated with the initial coreset. In some examples, the TCI state manager 1010 may transmit signaling indicating the identified TCI state. In some examples, the TCI state manager 1010 may identify a TCI state ordering, where the TCI state ordering includes at least one TCI state corresponding to each SSB associated with the initial coreset. In some examples, the TCI state manager 1010 may transmit signaling indicating the TCI state ordering.

The CORESET manager 1015 may transmit signaling over the initial coreset based on the TCI state.

The SSB manager 1020 may determine a number of SSBs being transmitted in association with the initial coreset.

In some examples, the SSB manager 1020 may transmit signaling indicating the number, where the set of TCI states includes at least one TCI state corresponding to each SSB of the number of SSBs. In some examples, the SSB manager 1020 may transmit a SSB, where the SSB indicates the initial coreset.

The QCL source manager 1025 may determine a number of quasi-collocated sources associated with the initial coreset. In some examples, the QCL source manager 1025 may transmit signaling indicating the number, where the set of TCI states includes at least one TCI state corresponding to each quasi-collocated source of the number of quasi-collocated sources.

Figure 11:
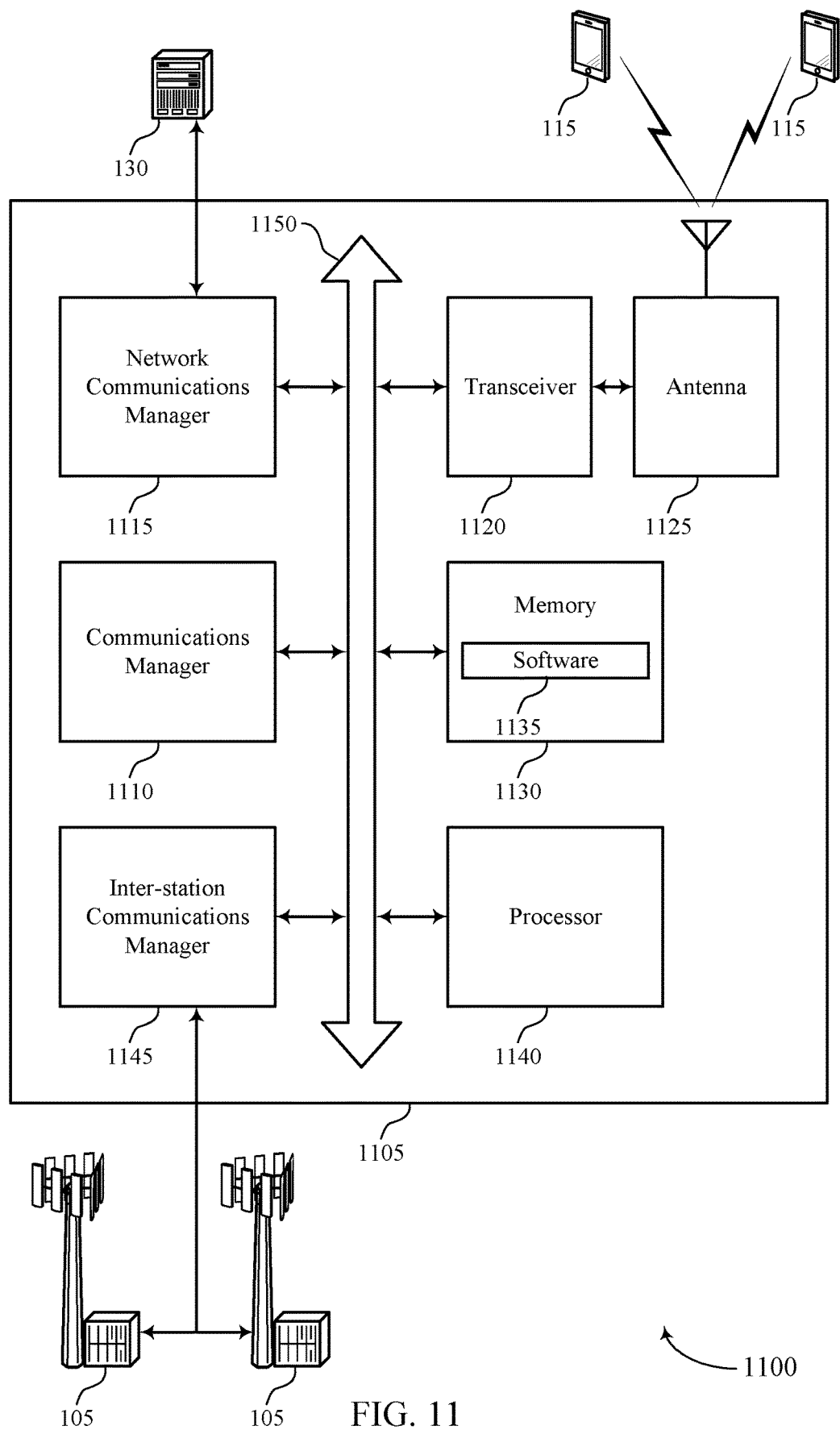
FIG. 11 shows a diagram of a system including a device that supports TCI state ordering for an initial coreset in accordance with aspects of the present disclosure.

FIG. 11 shows a diagram of a system 1100 including a device 1105 that supports TCI state ordering for an initial coreset in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a TCI state of a set of TCI states corresponding to an initial coreset, where the set of TCI states includes at least one TCI state corresponding to each SSB associated with the initial coreset, transmit signaling indicating the identified TCI state, and transmit signaling over the initial coreset based on the TCI state.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code or software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting TCI state ordering for an initial coreset).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
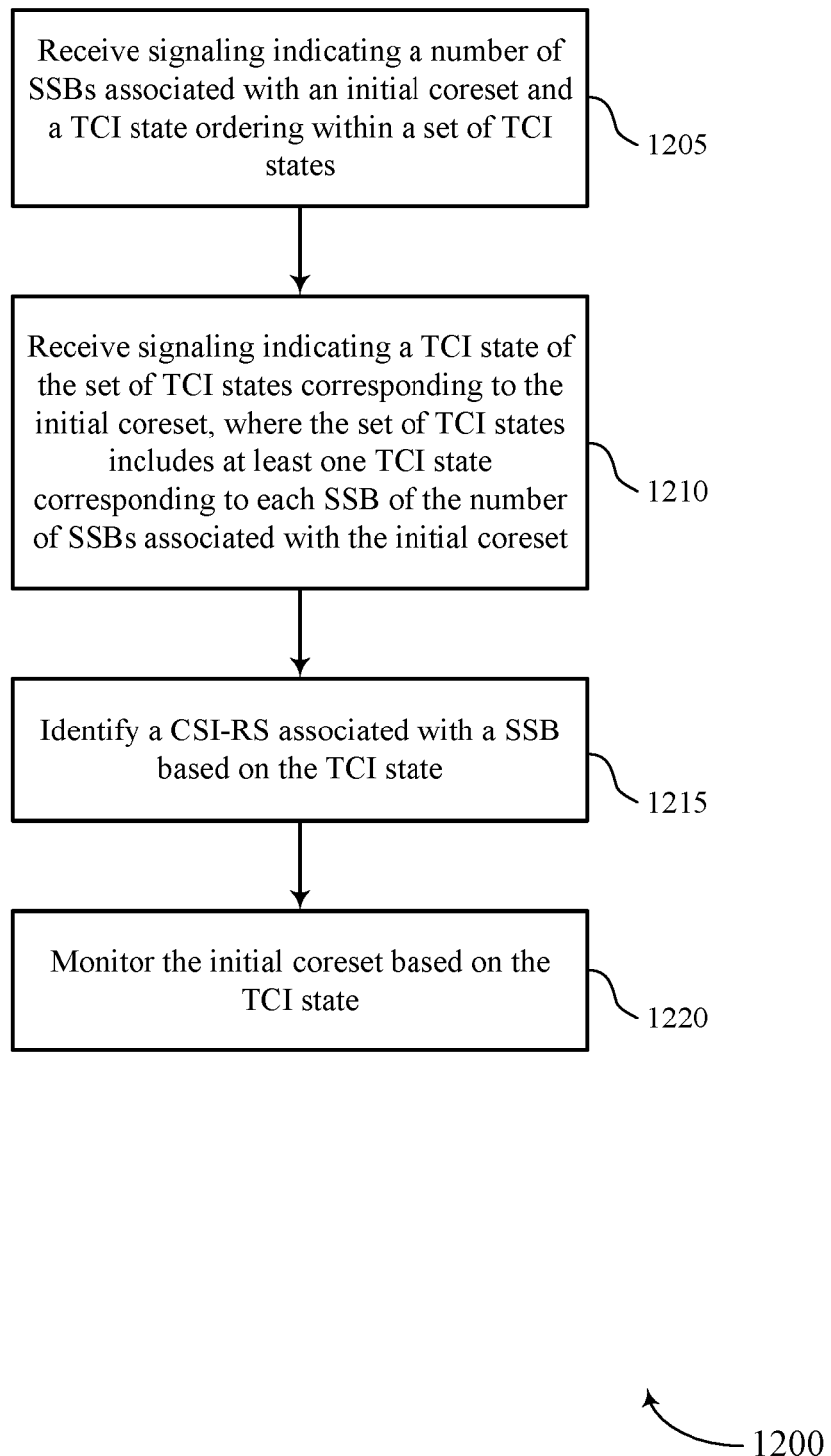
FIGS. 12 through 16 show flowcharts illustrating methods that support TCI state ordering for an initial coreset in accordance with aspects of the present disclosure.

FIG. 12 shows a flowchart illustrating a method 1200 that supports TCI state ordering for an initial coreset in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive signaling indicating a number of SSBs associated with an initial coreset and a TCI state ordering within a set of TCI states. The operations of 1205 may be performed according to the methods described herein. In some examples, aspects of the operations of 1205 may be performed by a TCI state manager as described with reference to FIGS. 4 through 7.

At 1210, the UE may receive signaling indicating a TCI state of the set of TCI states corresponding to the initial coreset, where the set of TCI states includes at least one TCI state corresponding to each SSB of the number of SSBs associated with the initial coreset. The operations of 1210 may be performed according to the methods described herein. In some examples, aspects of the operations of 1210 may be performed by a TCI state manager as described with reference to FIGS. 4 through 7.

At 1215, the UE may identify a CSI-RS associated with a SSB based on the TCI state. The operations of 1215 may be performed according to the methods described herein. In some examples, aspects of the operations of 1215 may be performed by a reference signal manager as described with reference to FIGS. 4 through 7.

At 1220, the UE may monitor the initial coreset based on the TCI state. The operations of 1220 may be performed according to the methods described herein. In some examples, aspects of the operations of 1220 may be performed by a CORESET manager as described with reference to FIGS. 4 through 7.

Figure 13:
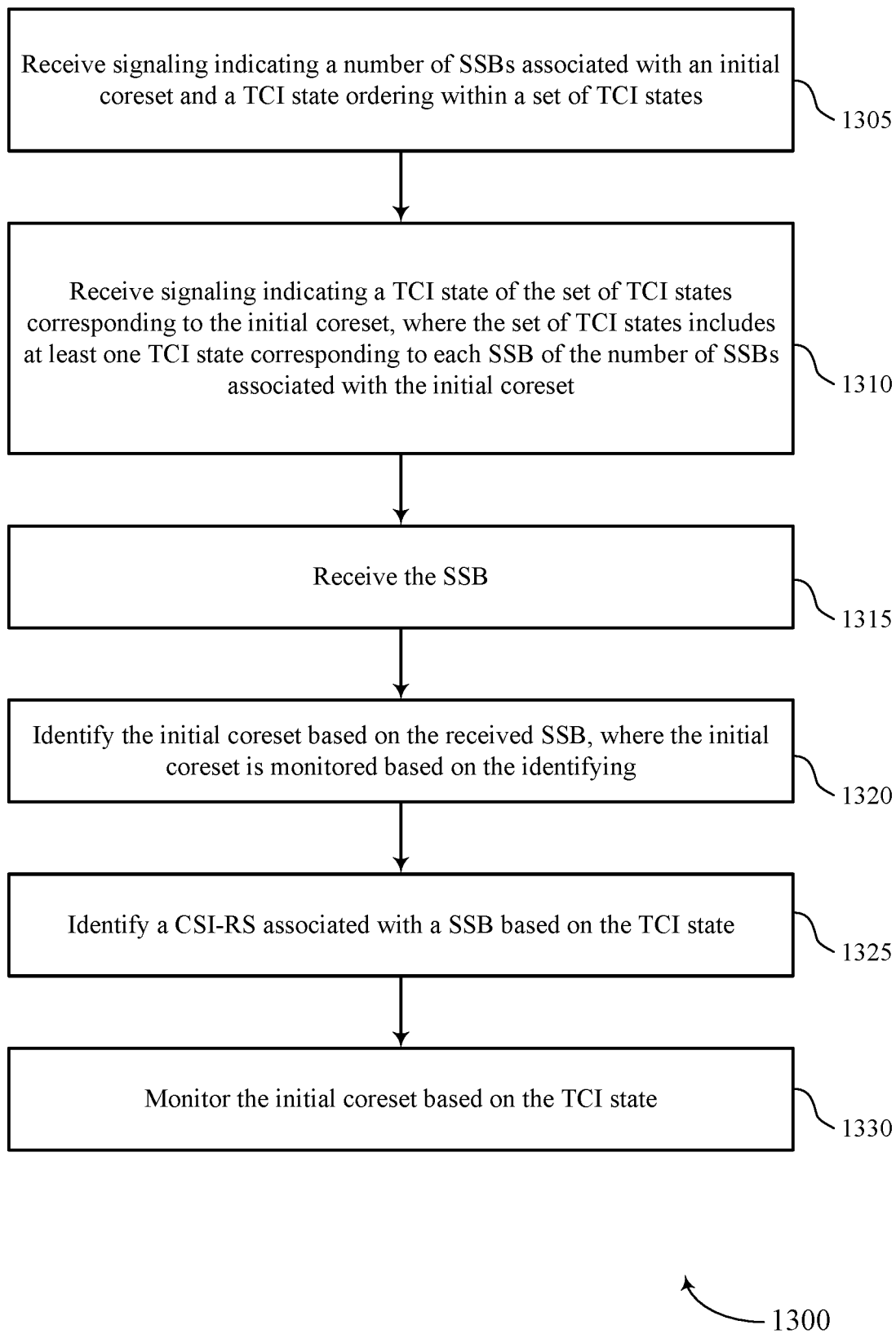

FIG. 13 shows a flowchart illustrating a method 1300 that supports TCI state ordering for an initial coreset in accordance with aspects of the present disclosure. Method 1300 may be performed in accordance with, in addition to or alternatively to the steps of the method 1200 as discussed with reference to FIG. 12. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive signaling indicating a number of SSBs associated with an initial coreset and a TCI state ordering within a set of TCI states. The operations of 1305 may be performed according to the methods described herein. In some examples, aspects of the operations of 1305 may be performed by a TCI state manager as described with reference to FIGS. 4 through 7.

At 1310, the UE may receive signaling indicating a TCI state of the set of TCI states corresponding to the initial coreset, where the set of TCI states includes at least one TCI state corresponding to each SSB of the number of SSBs associated with the initial coreset. The operations of 1310 may be performed according to the methods described herein. In some examples, aspects of the operations of 1310 may be performed by a TCI state manager as described with reference to FIGS. 4 through 7.

At 1315, the UE may receive an SSB. The operations of 1315 may be performed according to the methods described herein. In some examples, aspects of the operations of 1315 may be performed by a SSB manager as described with reference to FIGS. 4 through 7. In some cases, the relative timing of 1310 and 1315 may be interchanged.

At 1320, the UE may identify the initial coreset based on the received SSB, where the initial coreset is monitored based on the identifying. The operations of 1320 may be performed according to the methods described herein. In some examples, aspects of the operations of 1320 may be performed by a SSB manager as described with reference to FIGS. 4 through 7.

At 1325, the UE may identify a CSI-RS associated with a SSB based on the TCI state. The operations of 1325 may be performed according to the methods described herein. In some examples, aspects of the operations of 1325 may be performed by a reference signal manager as described with reference to FIGS. 4 through 7.

At 1330, the UE may monitor the initial coreset based on the TCI state. The operations of 1330 may be performed according to the methods described herein. In some examples, aspects of the operations of 1330 may be performed by a CORESET manager as described with reference to FIGS. 4 through 7.

Figure 14:
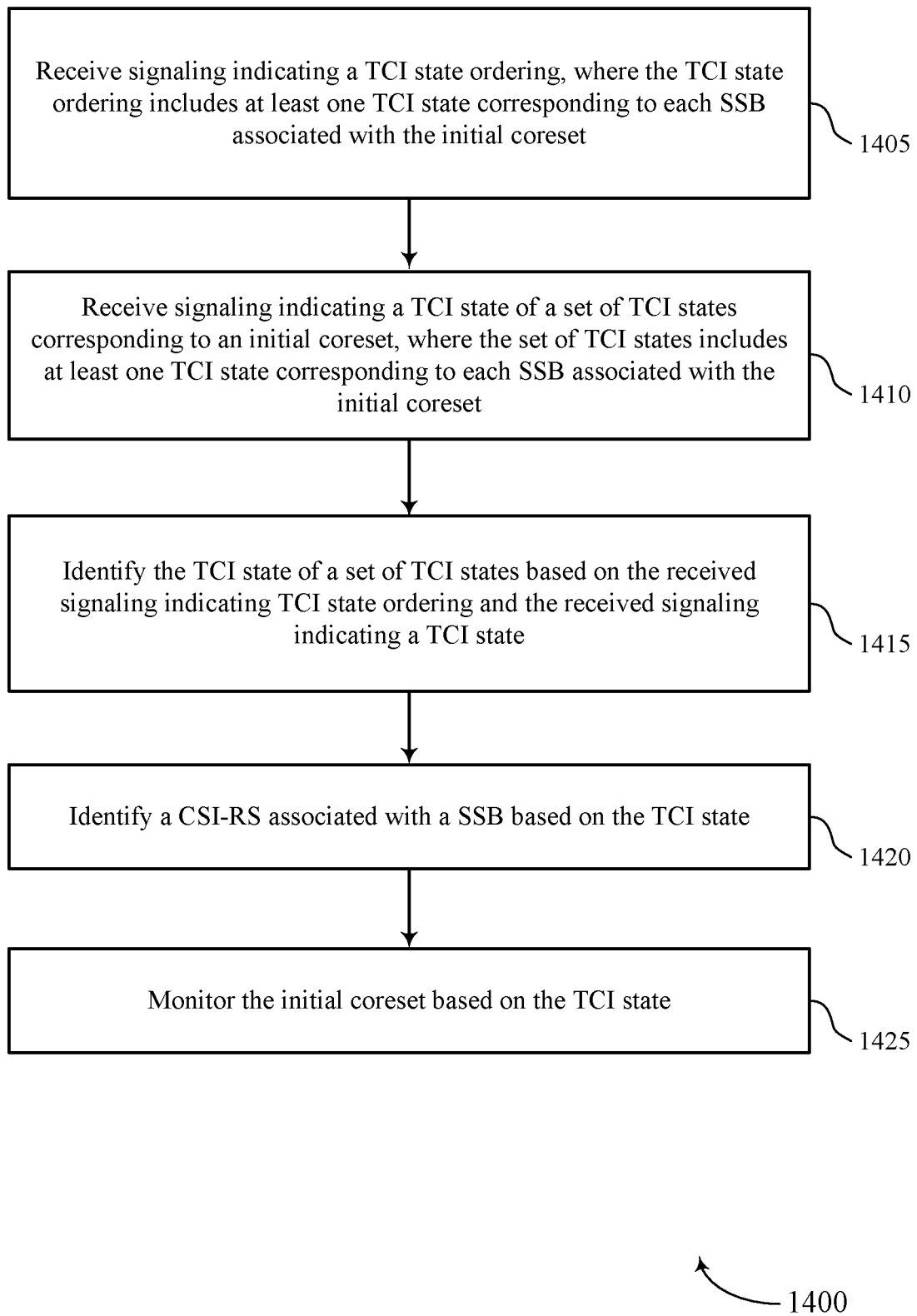

FIG. 14 shows a flowchart illustrating a method 1400 that supports TCI state ordering for an initial coreset in accordance with aspects of the present disclosure. Method 1400 may be performed in accordance with, in addition to, or alternatively to the steps of the method 1200 as discussed with reference to FIG. 12 and/or Method 1300 as discussed with reference to FIG. 13. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive signaling indicating TCI state ordering, where the TCI state ordering includes at least one TCI state corresponding to each SSB associated with the initial coreset. The operations of 1405 may be performed according to the methods described herein. In some examples, aspects of the operations of 1405 may be performed by a TCI state manager as described with reference to FIGS. 4 through 7.

At 1410, the UE may receive signaling indicating a TCI state of a set of TCI states corresponding to an initial coreset, where the set of TCI states includes at least one TCI state corresponding to each SSB associated with the initial coreset. The operations of 1410 may be performed according to the methods described herein. In some examples, aspects of the operations of 1410 may be performed by a TCI state manager as described with reference to FIGS. 4 through 7.

At 1415, the UE may identify the TCI state of a set of TCI states based on the received signaling indicating TCI state ordering and the received signaling indicating a TCI state. The operations of 1415 may be performed according to the methods described herein. In some examples, aspects of the operations of 1415 may be performed by a TCI state manager as described with reference to FIGS. 4 through 7.

At 1420, the UE may identify a CSI-RS associated with a SSB based on the TCI state. The operations of 1420 may be performed according to the methods described herein. In some examples, aspects of the operations of 1420 may be performed by a reference signal manager as described with reference to FIGS. 4 through 7.

At 1425, the UE may monitor the initial coreset based on the TCI state. The operations of 1425 may be performed according to the methods described herein. In some examples, aspects of the operations of 1425 may be performed by a CORESET manager as described with reference to FIGS. 4 through 7.

Figure 15:
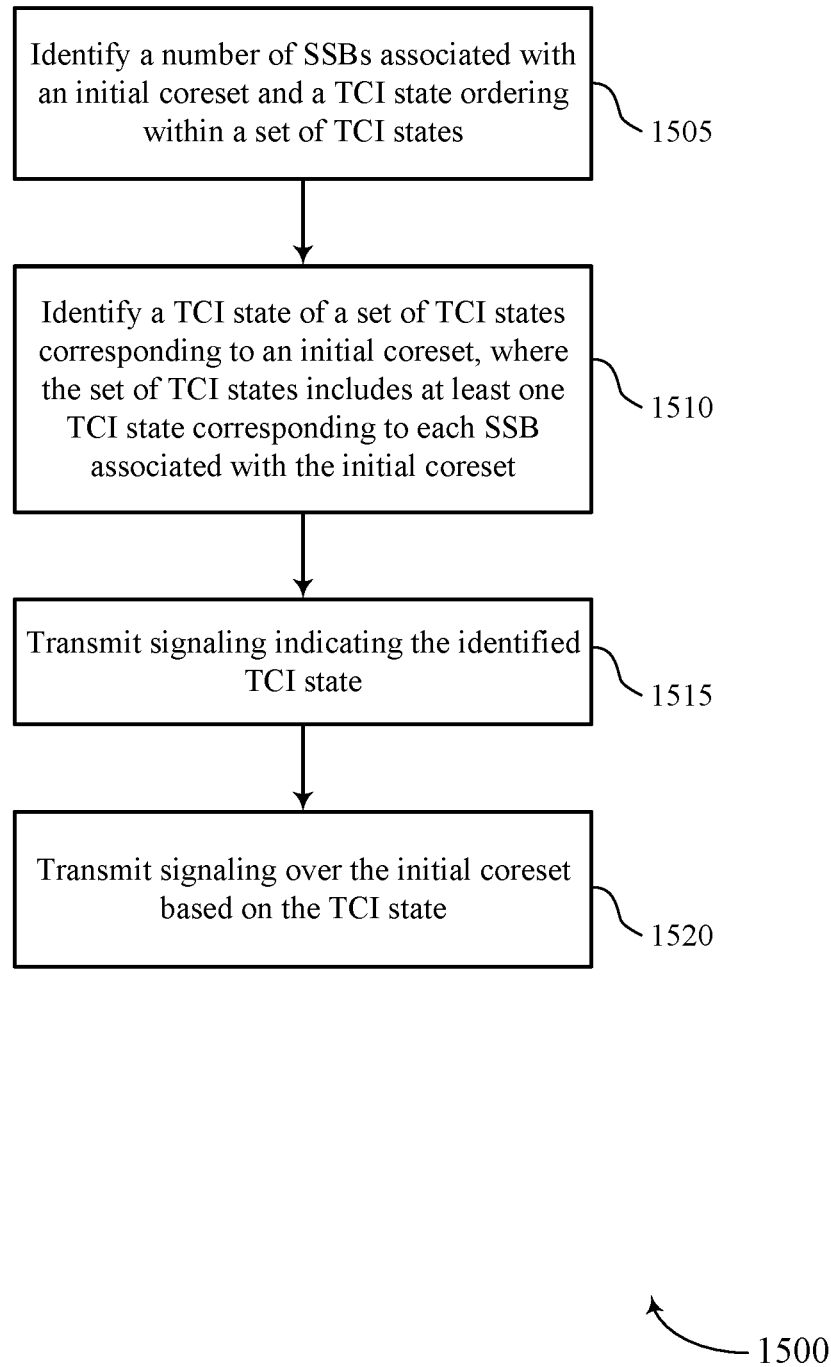

FIG. 15 shows a flowchart illustrating a method 1500 that supports TCI state ordering for an initial coreset in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may identify a number of SSBs associated with an initial coreset and a TCI state ordering within a set of TCI states. The operations of 1505 may be performed according to the methods described herein. In some examples, aspects of the operations of 1505 may be performed by a TCI state manager as described with reference to FIGS. 8 through 11.

At 1510, the base station may identify a TCI state of the set of TCI states corresponding to the initial coreset, where the set of TCI states includes at least one TCI state corresponding to each SSB of the number of SSBs associated with the initial coreset. The operations of 1510 may be performed according to the methods described herein. In some examples, aspects of the operations of 1510 may be performed by a TCI state manager as described with reference to FIGS. 8 through 11.

At 1515, the base station may transmit signaling indicating the identified TCI state. The operations of 1515 may be performed according to the methods described herein. In some examples, aspects of the operations of 1515 may be performed by a TCI state manager as described with reference to FIGS. 8 through 11.

At 1520, the base station may transmit signaling over the initial coreset based on the TCI state. The operations of 1520 may be performed according to the methods described herein. In some examples, aspects of the operations of 1520 may be performed by a CORESET manager as described with reference to FIGS. 8 through 11.

Figure 16:
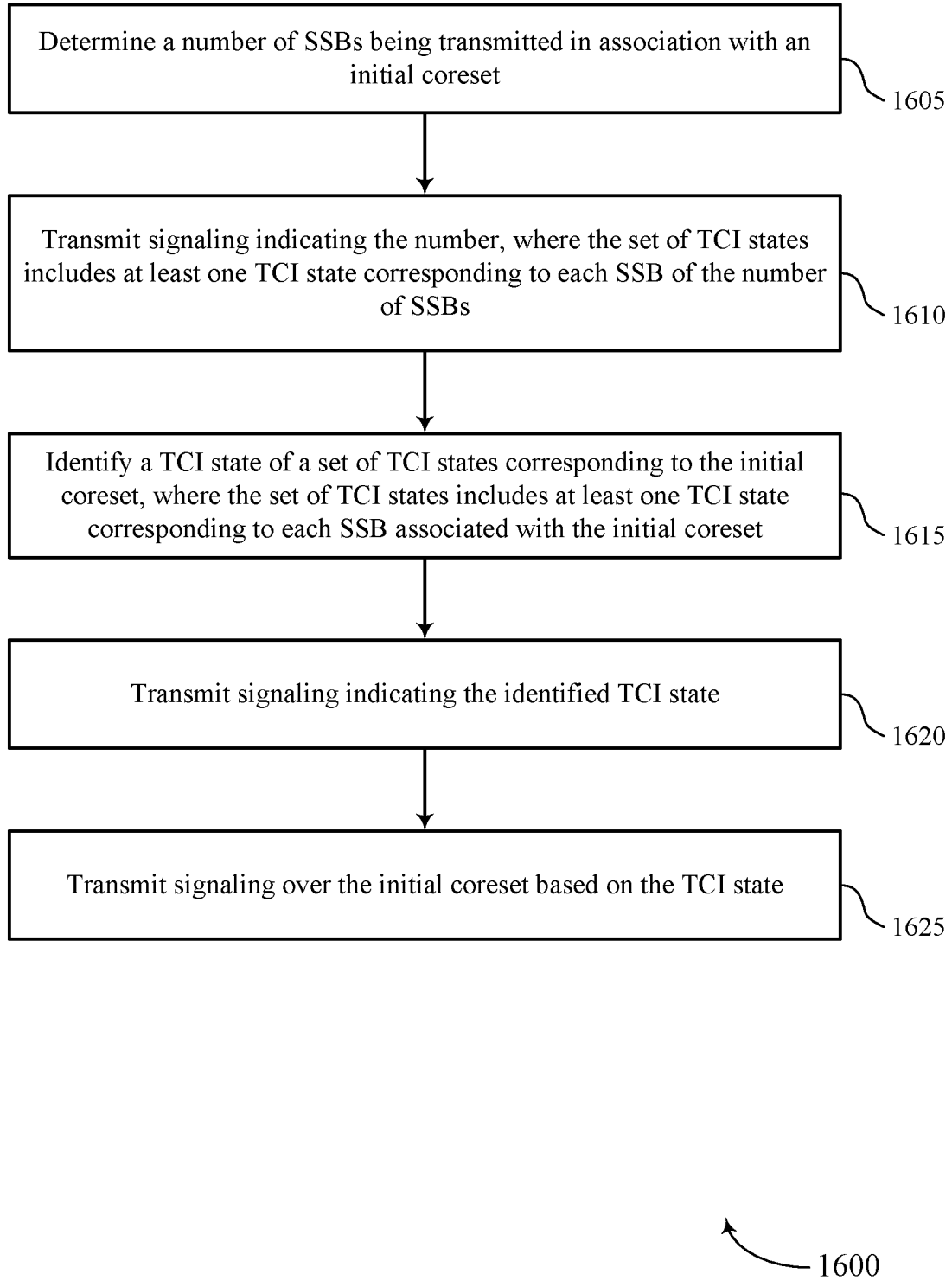

FIG. 16 shows a flowchart illustrating a method 1600 that supports TCI state ordering for an initial coreset in accordance with aspects of the present disclosure. Method 1600 may be performed in accordance with, in addition to, or alternatively to the steps of the method 1500 as discussed with reference to FIG. 15. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may determine a number of SSBs being transmitted in association with the initial coreset. The operations of 1605 may be performed according to the methods described herein. In some examples, aspects of the operations of 1605 may be performed by a SSB manager as described with reference to FIGS. 8 through 11.

At 1610, the base station may transmit signaling indicating the number, where the set of TCI states includes at least one TCI state corresponding to each SSB of the number of SSBs. The operations of 1610 may be performed according to the methods described herein. In some examples, aspects of the operations of 1610 may be performed by a SSB manager as described with reference to FIGS. 8 through 11.

At 1615, the base station may identify a TCI state of a set of TCI states corresponding to an initial coreset, where the set of TCI states includes at least one TCI state corresponding to each SSB associated with the initial coreset. The operations of 1615 may be performed according to the methods described herein. In some examples, aspects of the operations of 1615 may be performed by a TCI state manager as described with reference to FIGS. 8 through 11.

At 1620, the base station may transmit signaling indicating the identified TCI state. The operations of 1620 may be performed according to the methods described herein. In some examples, aspects of the operations of 1620 may be performed by a TCI state manager as described with reference to FIGS. 8 through 11.

At 1625, the base station may transmit signaling over the initial coreset based on the TCI state. The operations of 1625 may be performed according to the methods described herein. In some examples, aspects of the operations of 1625 may be performed by a CORESET manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. A corresponding computer program may comprise program instructions which are computer-executable to implement all steps of the described functions and/or methods. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving signaling indicating a number of synchronization signal blocks associated with an initial control resource set and a transmission configuration indication state ordering within a set of transmission configuration indication states;
   receiving signaling indicating a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
   identifying a channel state information reference signal associated with a synchronization signal block based at least in part on the transmission configuration indication state; and
   monitoring the initial control resource set based at least in part on the transmission configuration indication state.

2. The method of claim 1, further comprising:
   identifying spatial parameters based at least part on the transmission configuration indication state;
   performing a channel estimate for the channel state information reference signal based at least part on the spatial parameters; and
   monitoring the initial control resource set based at least in part on the channel estimation.

3. The method of claim 1, further comprising:
   receiving signaling indicating a number of synchronization signal blocks being transmitted in association with the initial control resource set, wherein the set of transmission configuration indication states includes at least one transmission configuration indication state corresponding to each synchronization signal block of the number of synchronization signal blocks.

4. The method of claim 1, further comprising:
   receiving signaling indicating a number of quasi-collocated sources associated with the initial control resource set, wherein the set of transmission configuration indication states includes at least one transmission configuration indication state corresponding to each quasi-collocated source of the number of quasi-collocated sources.

5. The method of claim 1, further comprising:
   receiving the synchronization signal block; and
   identifying the initial control resource set based at least in part on the received synchronization signal block, wherein the initial control resource set is monitored based at least in part on the identifying.

6. The method of claim 5, wherein the received synchronization signal block has a quasi co-location relationship with a reference signal of the indicated transmission configuration indication state.

7. The method of claim 1, further comprising:
   receiving signaling indicating transmission configuration indication state ordering, wherein the transmission configuration indication state ordering includes at least one transmission configuration indication state corresponding to each synchronization signal block associated with the initial control resource set; and identifying the transmission configuration indication state of a set of transmission configuration indication states based at least in part on the received signaling indicating transmission configuration indication state ordering and the received signaling indicating a transmission configuration indication state.

8. The method of claim 1, wherein the indicated transmission configuration indication state indicates a configuration of first and second reference signals that have a quasi co-location relationship and a quasi co-location type associated with the synchronization signal block.

9. A method for wireless communication by a base station, comprising:
identifying a number of synchronization signal blocks associated with an initial control resource set and a transmission configuration indication state ordering within a set of transmission configuration indication states;
identifying a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
transmitting signaling indicating the identified transmission configuration indication state; and
transmitting signaling over the initial control resource set based at least in part on the transmission configuration indication state.

10. The method of claim 9, further comprising:
determining a number of synchronization signal blocks being transmitted in association with the initial control resource set; and
transmitting signaling indicating the number, wherein the set of transmission configuration indication states includes at least one transmission configuration indication state corresponding to each synchronization signal block of the number of synchronization signal blocks.

11. The method of claim 9, further comprising:
determining a number of quasi-collocated sources associated with the initial control resource set; and
transmitting signaling indicating the number, wherein the set of transmission configuration indication states includes at least one transmission configuration indication state corresponding to each quasi-collocated source of the number of quasi-collocated sources.

12. The method of claim 9, further comprising:
transmitting a synchronization signal block, wherein the synchronization signal block indicates the initial control resource set.

13. The method of claim 9, further comprising:
identifying a transmission configuration indication state ordering, wherein the transmission configuration indication state ordering includes at least one transmission configuration indication state corresponding to each synchronization signal block associated with the initial control resource set; and
transmitting signaling indicating the transmission configuration indication state ordering.

14. An apparatus for wireless communication by a user equipment (UE), comprising:
a processor,
memory in electronic communication with the processor; and
instructions stored in the memory and executable by the processor to cause the apparatus to:
receive signaling indicating a number of synchronization signal blocks associated with an initial control resource set and a transmission configuration indication state ordering within a set of transmission configuration indication states;
receive signaling indicating a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
identify a channel state information reference signal associated with a synchronization signal block based at least in part on the transmission configuration indication state; and
monitor the initial control resource set based at least in part on the transmission configuration indication state.

15. The apparatus of claim 14, wherein the instructions are further executable by the processor to:
identify spatial parameters based at least part on the transmission configuration indication state;
perform channel estimate for the channel state information reference signal based at least part on the spatial parameters; and
monitor the initial control resource set based at least in part on the channel estimation.

16. The apparatus of claim 14, wherein the instructions are further executable by the processor to cause the apparatus to:
receive signaling indicating a number of synchronization signal blocks being transmitted in association with the initial control resource set, wherein the set of transmission configuration indication states includes at least one transmission configuration indication state corresponding to each synchronization signal block of the number of synchronization signal blocks.

17. The apparatus of claim 14, wherein the instructions are further executable by the processor to cause the apparatus to:
receive signaling indicating a number of quasi-collocated sources associated with the initial control resource set, wherein the set of transmission configuration indication states includes at least one transmission configuration indication state corresponding to each quasi-collocated source of the number of quasi-collocated sources.

18. The apparatus of claim 14, wherein the instructions are further executable by the processor to cause the apparatus to:
receive the synchronization signal block; and
identify the initial control resource set based at least in part on the received synchronization signal block, wherein the initial control resource set is monitored based at least in part on the identifying.

19. The apparatus of claim 18, wherein the received synchronization signal block has a quasi co-location relationship with a reference signal of the indicated transmission configuration indication state.

20. The apparatus of claim 14, wherein the instructions are further executable by the processor to cause the apparatus to:
- receive signaling indicating transmission configuration indication state ordering, wherein the transmission configuration indication state ordering includes at least one transmission configuration indication state corresponding to each synchronization signal block associated with the initial control resource set; and
- identify the transmission configuration indication state of a set of transmission configuration indication states based at least in part on the received signaling indicating transmission configuration indication state ordering and the received signaling indicating a transmission configuration indication state.

21. The apparatus of claim 14, wherein the indicated transmission configuration indication state indicates a configuration of first and second reference signals that have a quasi co-location relationship and a quasi co-location type associated with the synchronization signal block.

22. An apparatus for wireless communication by a base station, comprising:
- a processor,
- memory in electronic communication with the processor; and
- instructions stored in the memory and executable by the processor to cause the apparatus to:
  - identify a number of synchronization signal blocks associated with an initial control resource set and a transmission configuration indication state ordering within a set of transmission configuration indication states;
  - identify a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
  - transmit signaling indicating the identified transmission configuration indication state; and
  - transmit signaling over the initial control resource set based at least in part on the transmission configuration indication state.

23. The apparatus of claim 22, wherein the instructions are further executable by the processor to cause the apparatus to:
- determine a number of synchronization signal blocks being transmitted in association with the initial control resource set; and
- transmit signaling indicating the number, wherein the set of transmission configuration indication states includes at least one transmission configuration indication state corresponding to each synchronization signal block of the number of synchronization signal blocks.

24. The apparatus of claim 22, wherein the instructions are further executable by the processor to cause the apparatus to:
- determine a number of quasi-collocated sources associated with the initial control resource set; and
- transmit signaling indicating the number, wherein the set of transmission configuration indication states includes at least one transmission configuration indication state corresponding to each quasi-collocated source of the number of quasi-collocated sources.

25. The apparatus of claim 22, wherein the instructions are further executable by the processor to cause the apparatus to:
- transmit a synchronization signal block, wherein the synchronization signal block indicates the initial control resource set.

26. The apparatus of claim 22, wherein the instructions are further executable by the processor to cause the apparatus to:
- identify a transmission configuration indication state ordering, wherein the transmission configuration indication state ordering includes at least one transmission configuration indication state corresponding to each synchronization signal block associated with the initial control resource set; and
- transmit signaling indicating the transmission configuration indication state ordering.

27. An apparatus for wireless communication by a user equipment (UE), comprising:
- means for receiving signaling indicating a number of synchronization signal blocks associated with an initial control resource set and a transmission configuration indication state ordering within a set of transmission configuration indication states;
- means for receiving signaling indicating a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
- means for identifying a channel state information reference signal associated with a synchronization signal block based at least in part on the transmission configuration indication state; and
- means for monitoring the initial control resource set based at least in part on the transmission configuration indication state.

28. The apparatus of claim 27, further comprising:
- means for identifying spatial parameters based at least part on the transmission configuration indication state;
- means for performing channel estimate for the channel state information reference signal based at least part on the spatial parameters; and
- means for monitoring the initial control resource set based at least in part on the channel estimation.

29. The apparatus of claim 27, further comprising:
- means for receiving signaling indicating a number of synchronization signal blocks being transmitted in association with the initial control resource set, wherein the set of transmission configuration indication states includes at least one transmission configuration indication state corresponding to each synchronization signal block of the number of synchronization signal blocks.

30. The apparatus of claim 27, further comprising:
- means for receiving signaling indicating a number of quasi-collocated sources associated with the initial control resource set, wherein the set of transmission configuration indication states includes at least one transmission configuration indication state corresponding to each quasi-collocated source of the number of quasi-collocated sources.

31. The apparatus of claim 27, further comprising:
means for receiving the synchronization signal block; and
means for identifying the initial control resource set based at least in part on the received synchronization signal block, wherein the initial control resource set is monitored based at least in part on the identifying.

32. The apparatus of claim 31, wherein the received synchronization signal block has a quasi co-location relationship with a reference signal of the indicated transmission configuration indication state.

33. The apparatus of claim 27, further comprising:
means for receiving signaling indicating transmission configuration indication state ordering, wherein the transmission configuration indication state ordering includes at least one transmission configuration indication state corresponding to each synchronization signal block associated with the initial control resource set; and
means for identifying the transmission configuration indication state of a set of transmission configuration indication states based at least in part on the received signaling indicating transmission configuration indication state ordering and the received signaling indicating a transmission configuration indication state.

34. The apparatus of claim 27, wherein the indicated transmission configuration indication state indicates a configuration of first and second reference signals that have a quasi co-location relationship and a quasi co-location type associated with the synchronization signal block.

35. An apparatus for wireless communication by a base station, comprising:
means for identifying a number of synchronization signal blocks associated with an initial control resource set and a transmission configuration indication state ordering within a set of transmission configuration indication states;
means for identifying a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
means for transmitting signaling indicating the identified transmission configuration indication state; and
means for transmitting signaling over the initial control resource set based at least in part on the transmission configuration indication state.

36. The apparatus of claim 35, further comprising:
means for determining a number of synchronization signal blocks being transmitted in association with the initial control resource set; and
means for transmitting signaling indicating the number, wherein the set of transmission configuration indication states includes at least one transmission configuration indication state corresponding to each synchronization signal block of the number of synchronization signal blocks.

37. The apparatus of claim 35, further comprising:
means for determining a number of quasi-collocated sources associated with the initial control resource set; and
means for transmitting signaling indicating the number, wherein the set of transmission configuration indication states includes at least one transmission configuration indication state corresponding to each quasi-collocated source of the number of quasi-collocated sources.

38. The apparatus of claim 35, further comprising:
means for transmitting a synchronization signal block, wherein the synchronization signal block indicates the initial control resource set.

39. The apparatus of claim 35, further comprising:
means for identifying a transmission configuration indication state ordering, wherein the transmission configuration indication state ordering includes at least one transmission configuration indication state corresponding to each synchronization signal block associated with the initial control resource set; and
means for transmitting signaling indicating the transmission configuration indication state ordering.

40. A non-transitory computer-readable medium storing code for wireless communication by a user equipment (UE), the code comprising instructions executable by a processor to:
receive signaling indicating a number of synchronization signal blocks associated with an initial control resource set and a transmission configuration indication state ordering within a set of transmission configuration indication states;
receive signaling indicating a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;
identify a channel state information reference signal associated with a synchronization signal block based at least in part on the transmission configuration indication state; and
monitor the initial control resource set based at least in part on the transmission configuration indication state.

41. The non-transitory computer-readable medium of claim 40, wherein the instructions are further executable to:
identify spatial parameters based at least part on the transmission configuration indication state;
perform channel estimate for the channel state information reference signal based at least part on the spatial parameters; and
monitor the initial control resource set based at least in part on the channel estimation.

42. The non-transitory computer-readable medium of claim 40, wherein the instructions are further executable to:
receive signaling indicating a number of synchronization signal blocks being transmitted in association with the initial control resource set, wherein the set of transmission configuration indication states includes at least one transmission configuration indication state corresponding to each synchronization signal block of the number of synchronization signal blocks.

43. The non-transitory computer-readable medium of claim 40, wherein the instructions are further executable to:
receive signaling indicating a number of quasi-collocated sources associated with the initial control resource set, wherein the set of transmission configuration indication states includes at least one transmission configuration indication state corresponding to each quasi-collocated source of the number of quasi-collocated sources.

44. The non-transitory computer-readable medium of claim 40, wherein the instructions are further executable to:

receive the synchronization signal block; and identify the initial control resource set based at least in part on the received synchronization signal block, wherein the initial control resource set is monitored based at least in part on the identifying.

45. The non-transitory computer-readable medium of claim 44, wherein the received synchronization signal block has a quasi co-location relationship with a reference signal of the indicated transmission configuration indication state.

46. The non-transitory computer-readable medium of claim 40, wherein the instructions are further executable to:

receive signaling indicating transmission configuration indication state ordering, wherein the transmission configuration indication state ordering includes at least one transmission configuration indication state corresponding to each synchronization signal block associated with the initial control resource set; and identify the transmission configuration indication state of a set of transmission configuration indication states based at least in part on the received signaling indicating transmission configuration indication state ordering and the received signaling indicating a transmission configuration indication state.

47. The non-transitory computer-readable medium of claim 40, wherein the indicated transmission configuration indication state indicates a configuration of first and second reference signals that have a quasi co-location relationship and a quasi co-location type associated with the synchronization signal block.

48. A non-transitory computer-readable medium storing code for wireless communication by a base station, the code comprising instructions executable by a processor to:

identify a number of synchronization signal blocks associated with an initial control resource set and a transmission configuration indication state ordering within a set of transmission configuration indication states;

identify a transmission configuration indication state of the set of transmission configuration indication states corresponding to the initial control resource set, wherein the set of transmission configuration indication states includes at least one transmission configuration indication state corresponding to each synchronization signal block of the number of synchronization signal blocks associated with the initial control resource set;

transmit signaling indicating the identified transmission configuration indication state; and transmit signaling over the initial control resource set based at least in part on the transmission configuration indication state.

49. The non-transitory computer-readable medium of claim 48, wherein the instructions are further executable to:

determine a number of synchronization signal blocks being transmitted in association with the initial control resource set; and transmit signaling indicating the number, wherein the set of transmission configuration indication states includes at least one transmission configuration indication state corresponding to each synchronization signal block of the number of synchronization signal blocks.

50. The non-transitory computer-readable medium of claim 48, wherein the instructions are further executable to:

determine a number of quasi-collocated sources associated with the initial control resource set; and transmit signaling indicating the number, wherein the set of transmission configuration indication states includes at least one transmission configuration indication state corresponding to each quasi-collocated source of the number of quasi-collocated sources.

51. The non-transitory computer-readable medium of claim 48, wherein the instructions are further executable to:

transmit a synchronization signal block, wherein the synchronization signal block indicates the initial control resource set.

52. The non-transitory computer-readable medium of claim 48, wherein the instructions are further executable to:

identify a transmission configuration indication state ordering, wherein the transmission configuration indication state ordering includes at least one transmission configuration indication state corresponding to each synchronization signal block associated with the initial control resource set; and transmit signaling indicating the transmission configuration indication state ordering.

* * * * *